US009180897B2

(12) United States Patent
Boivin et al.

(10) Patent No.: US 9,180,897 B2
(45) Date of Patent: Nov. 10, 2015

(54) MODULAR UTILITY CART

(71) Applicants: Mathieu Boivin, Montreal (CA);
Martin Bélanger, Montreal (CA);
Martin Gauthier, Montreal (CA);
Mathieu Audet, Montreal (CA)

(72) Inventors: Mathieu Boivin, Montreal (CA);
Martin Bélanger, Montreal (CA);
Martin Gauthier, Montreal (CA);
Mathieu Audet, Montreal (CA)

(73) Assignee: NORDUYN INC., Montreal (CA)

( * ) Notice: Subject to any disclaimer, the term of this patent is extended or adjusted under 35 U.S.C. 154(b) by 56 days.

(21) Appl. No.: 13/896,823

(22) Filed: May 17, 2013

(65) Prior Publication Data

US 2013/0241165 A1 Sep. 19, 2013

(51) Int. Cl.
*B62B 3/00* (2006.01)
(52) U.S. Cl.
CPC . *B62B 3/00* (2013.01); *B62B 3/003* (2013.01); *B62B 3/004* (2013.01); *B62B 3/005* (2013.01); *B62B 2202/67* (2013.01); *B62B 2501/04* (2013.01); *B62B 2501/065* (2013.01); *Y10T 29/49826* (2015.01)
(58) Field of Classification Search
CPC .......... B62B 3/00; B62B 3/002; B62B 3/003; B62B 3/004; B62B 3/005; B62B 3/02; B62B 3/04; B62B 2202/67; B64D 11/04; B64D 11/0007; A47B 31/06
USPC .............. 280/79.2, 47.34, 47.35, 79.11, 79.3, 280/47.11, 638; 312/249.8, 249.9, 107–109
See application file for complete search history.

(56) References Cited

U.S. PATENT DOCUMENTS

| | | | |
|---|---|---|---|
| 3,625,397 A | 12/1971 | Shelly | |
| 3,877,744 A | 4/1975 | Miller | |
| 3,951,426 A | 4/1976 | Shaffer | |
| 3,987,871 A | 10/1976 | Nordskog | |
| 4,073,369 A | 2/1978 | Nordskog | |
| 4,671,470 A * | 6/1987 | Jonas | 244/119 |
| 4,936,377 A * | 6/1990 | DeVogel et al. | 165/47 |
| 5,001,977 A | 3/1991 | Tracy | |
| 5,028,761 A | 7/1991 | Oda | |
| 5,056,194 A | 10/1991 | Huber | |
| 5,069,466 A | 12/1991 | Propst | |
| 5,322,244 A * | 6/1994 | Dallmann et al. | 244/118.5 |
| 5,449,232 A | 9/1995 | Westbrooks, Jr. | |
| 5,566,961 A * | 10/1996 | Snell et al. | 280/47.35 |

(Continued)

FOREIGN PATENT DOCUMENTS

| | | |
|---|---|---|
| EP | 0046414 | 2/1982 |
| EP | 0080313 | 6/1983 |

(Continued)

OTHER PUBLICATIONS

Patent Cooperation Treaty, PCT International Search Report, Jul. 12, 2009, 3 pages, PCT/CA2009/001771.

(Continued)

*Primary Examiner* — James M Dolak
(74) *Attorney, Agent, or Firm* — Mathieu Audet

(57) ABSTRACT

A modular utility cart comprising a body defining a door opening; wheels attached to a lower portion of the body for supporting the body; and a door operatively attached to the body and adapted to mate with the door opening, wherein the body is adapted to receive a utility module thereto is provided. A method of assembling a modular utility cart is also provided. A kit of utility cart and utility module(s) is equally provided herein.

14 Claims, 24 Drawing Sheets

(56) References Cited

U.S. PATENT DOCUMENTS

| | | |
|---|---|---|
| 5,749,193 A | 5/1998 | Bucher |
| 5,785,202 A | 7/1998 | Stephan |
| 5,829,767 A | 11/1998 | Grossman |
| 5,947,494 A | 9/1999 | Thogersen |
| 5,979,917 A | 11/1999 | Thogersen |
| 6,034,355 A | 3/2000 | Naderi |
| 6,106,084 A | 8/2000 | Thogersen |
| 6,131,929 A * | 10/2000 | Haley .................. 280/47.34 |
| 6,234,498 B1 | 5/2001 | Saku |
| 6,425,649 B2 * | 7/2002 | Kasuya .................. 312/409 |
| 6,460,952 B1 | 10/2002 | Tryon |
| 6,474,677 B2 | 11/2002 | Kasuya |
| 6,629,581 B2 | 10/2003 | Lambiaso |
| 7,044,335 B2 | 5/2006 | Aguirre |
| 7,287,820 B2 | 10/2007 | Van Loon |
| 7,394,042 B2 | 7/2008 | Fortmann |
| 7,444,830 B2 | 11/2008 | Moran |
| 7,458,441 B2 | 12/2008 | Hu |
| 7,544,915 B2 | 6/2009 | Hu |
| 7,661,459 B2 * | 2/2010 | Wesley et al. ................. 165/11.1 |
| 7,814,638 B2 * | 10/2010 | Schalla .................. 280/651 |
| 7,836,876 B2 * | 11/2010 | Schellenberg ................. 126/268 |
| 7,942,430 B2 * | 5/2011 | Van Loon et al. .......... 280/47.34 |
| 8,465,030 B2 * | 6/2013 | Boivin et al. ............. 280/47.34 |
| 8,474,274 B2 * | 7/2013 | Schalla et al. .................... 62/89 |
| 8,550,477 B2 * | 10/2013 | Bennett et al. ............. 280/47.35 |
| 9,033,278 B2 * | 5/2015 | Van Loon et al. .......... 244/118.5 |
| 9,060,600 B2 * | 6/2015 | Strauss ................. 1/1 |
| 2001/0009347 A1 | 7/2001 | Kasuya |
| 2001/0010419 A1 | 8/2001 | Kasuya |
| 2003/0042073 A1 | 3/2003 | Lambiaso |
| 2004/0226960 A1 | 11/2004 | Aguirre |
| 2005/0193760 A1 | 9/2005 | Moran |
| 2005/0218615 A1 | 10/2005 | Hu |
| 2005/0285360 A1 | 12/2005 | Helin |
| 2006/0055290 A1 * | 3/2006 | Schalla ..................... 312/223.1 |
| 2006/0070814 A1 | 4/2006 | Hu |
| 2008/0116773 A1 | 5/2008 | Van Loom |
| 2008/0120187 A1 | 5/2008 | Wesley |
| 2008/0136299 A1 | 6/2008 | Peurifoy |
| 2009/0055290 A1 | 2/2009 | Harris |
| 2010/0090429 A1 | 4/2010 | Hartmann |
| 2010/0129184 A1 | 5/2010 | Th gersen |
| 2010/0140890 A1 | 6/2010 | Boivin |
| 2010/0155391 A1 | 6/2010 | Koschberg |
| 2010/0243801 A1 | 9/2010 | Saint-Jalmes |
| 2011/0006496 A1 | 1/2011 | Knoppers |
| 2011/0025006 A1 | 2/2011 | Knoppers |
| 2011/0233882 A1 | 9/2011 | Belanger |
| 2011/0248458 A1 | 10/2011 | Belanger |
| 2011/0278879 A1 | 11/2011 | Belanger |

FOREIGN PATENT DOCUMENTS

| | | |
|---|---|---|
| EP | 0289258 | 11/1988 |
| EP | 470149 | 2/1992 |
| EP | 0645129 | 3/1995 |
| EP | 678438 | 10/1995 |
| EP | 0700820 | 3/1996 |
| EP | 855868 | 8/1998 |
| EP | 0922412 | 6/1999 |
| EP | 0922413 | 6/1999 |
| EP | 0922414 | 6/1999 |
| EP | 0922415 | 6/1999 |
| EP | 936334 | 8/1999 |
| EP | 999967 | 5/2000 |
| EP | 1055528 | 11/2000 |
| EP | 1125520 | 8/2001 |
| EP | 1335837 | 8/2003 |
| EP | 1700764 | 9/2003 |
| EP | 1022185 | 10/2005 |
| EP | 1551709 | 3/2006 |
| EP | 1592614 | 9/2006 |
| EP | 1308110 | 3/2007 |
| EP | 1542565 | 9/2007 |
| EP | 2246243 | 11/2007 |
| WO | WO9012721 | 4/1990 |
| WO | WO9101098 | 2/1991 |
| WO | WO9202160 | 2/1992 |
| WO | WO9701475 | 1/1997 |
| WO | WO9739653 | 10/1997 |
| WO | WO9739654 | 10/1997 |
| WO | WO9906260 | 7/1998 |
| WO | WO9941479 | 8/1999 |
| WO | WO0021410 | 4/2000 |
| WO | WO0021830 | 4/2000 |
| WO | WO0219231 | 3/2002 |
| WO | WO0242093 | 5/2002 |
| WO | WO03023993 | 3/2003 |
| WO | WO2004028301 | 4/2004 |
| WO | WO2004103887 | 12/2004 |
| WO | WO2005085075 | 9/2005 |
| WO | WO2006093410 | 9/2006 |
| WO | WO2006093412 | 9/2006 |
| WO | WO2007023318 | 3/2007 |
| WO | WO2007061622 | 5/2007 |
| WO | WO2008020084 | 2/2008 |
| WO | WO2008063403 | 5/2008 |
| WO | WO2008067428 | 6/2008 |
| WO | WO2008070715 | 6/2008 |
| WO | WO2008070835 | 6/2008 |
| WO | WO2008079345 | 7/2008 |
| WO | WO2009008707 | 1/2009 |
| WO | WO2009120067 | 10/2009 |
| WO | WO2010020964 | 2/2010 |
| WO | WO2010046479 | 4/2010 |
| WO | WO2010084005 | 7/2010 |

OTHER PUBLICATIONS

Patent Cooperation Treaty, PCT Written Opinion of the International Searching Authority, Jul. 12, 2009, 5 pages, PCT/CA2009/001771.

* cited by examiner

MODULAR UTILITY CART

CROSS-REFERENCE

The present invention relates to and is a continuation of U.S. patent application Ser. No. 12/631,823, filed Dec. 5, 2009, entitled MODULAR UTILITY CART, which relates to and claims priority from U.S. Provisional Patent Application No. 61/120,477, filed Dec. 7, 2008, entitled GALLEY CART and from U.S. Provisional Patent Application No. 61/120,502, filed Dec. 8, 2008, entitled GALLEY CART PROCESS, all the documents above are incorporated herein by reference.

FIELD OF THE INVENTION

This invention relates generally to a utility cart for moving objects. More precisely, the present invention relates to a modular utility cart.

BACKGROUND OF THE INVENTION

Utility carts are used in the transport industry to perform different tasks. They must carry goods and be configured to serve drinks, food, sell goods and collect garbage, among other tasks, along galleys. Legacy galley carts are provided with a unique planar upper surface that is more or less suitable for performing each task. However, it is desirable to have a galley cart that can be adapted for performing specific tasks.

The improved adaptation of a galley cart for a precise task can become an expensive and tedious process. Customizing a galley cart requires a specific design that might be less suitable for other tasks. It is therefore likely that a greater number of galley carts are required to perform all the required tasks. The design of more "specialized carts" multiplies expensive adapted manufacturing tooling. It is therefore desirable to reuse the parts of a cart on more than one cart design and only change the portion dedicated to perform the specific task.

From a commercialization point of view, the specialization of galley carts means more parts; more inventory thus more storage room. It is therefore desirable to combine existing parts to build a variety of galley carts configured to handle different tasks.

Additionally, the transportation industry is in quest of energy efficiency. The energy needed to move an object is mainly determine by the following equation:

$$E = \tfrac{1}{2} m \cdot v^2$$

It is well known that a mass (m) reduction will decrease the energy (E) required to move an object. Therefore, the mass of a vehicle should be reduced to improve energy efficiency of the vehicle.

Various strategies can be used to reduce the mass of a vehicle. Either the mass of the vehicle itself is reduced or the mass of the object it carries is reduced.

Airplanes are weight sensitive for obvious reasons that will not be discussed here. Airlines are cost conscious and are in quest of reducing their exploitation cost. One cost reducing strategy is to use lighter parts and equipments used inside the airplane to lighten the airplane. One of these equipments is the galley cart that is used to carry passengers' food, beverages and other goods.

However, galley carts used in aircrafts are subjected to many technical requirements that must be considered closely. Among others, mechanical resistance and fire resistance requirements are mandatory and have a direct impact on the design of the galley cart and the choice of material that can be used to manufacture the galley cart.

Some galley cart uses are more restrictive than others. For instance, galley carts dedicated to be used in the aeronautic industry must comply with mandatory regulations. For example, when regulations apply to fire resistance, the material should carefully be selected and the manufacturing method needs to be adapted for the selected material. Vertical burn test (FAR 25.853), OSU heat release (65/65), smoke toxicity and smoke density are other possible requirements. It sometimes happens that legacy-manufacturing methods are not adapted to be used with the material suitable to meet the technical requirements and some challenges must be overcome to build regulation compliant cart parts.

Other energy saving considerations exist in relation with a galley cart. The thermal efficiency of the galley cart is one of them since it takes energy to cool or heat the content of the galley cart. The saving is not made through a mass reduction but by restricting the amount of energy required to cool or to warm the galley cart and, consequently, the size of the associated cooling or warming device. It is therefore desirable to use a material having insulation capacity thereof.

Other deficiencies will become apparent to one skilled in the art to which the invention pertains in view of the following summary and detailed description with its appended figures.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description of exemplary embodiments that is presented later.

Therefore, one object of the present invention improves at least some of the deficiencies associated with the drawbacks identified above.

It is one object of the present invention to provide a galley cart adapted to perform a plurality of tasks by changing a limited number of parts thereof. A modular construction allows for changing only a few parts to modify the function of the galley cart. Changing the combination of a limited number of interchangeable parts allows for improved flexibility while maintaining manufacturing cost reasonably low.

It is one object of the present invention to provide a modular galley cart.

One object of the present invention provides a galley cart adapted to receive a variety of utility modules thereon.

Another object of the present invention provides a method for building custom galley cart by combining a desired arrangement of body, door and utility module together.

Another object of the present invention provides a lightweight, yet sturdy, modular galley cart.

One object of the invention provides a fire resistant modular galley cart for use in airplanes.

An object of the invention provides a modular galley cart made of composite materials Another object of the invention provides a modular galley cart made of composite materials shaped in a continuous body wall.

An object of the present invention provides a modular galley cart adapted to easily receive and remove a utility module thereof.

One aspect of the present invention provides a securing mechanism on a galley cart, the securing mechanism being adapted to quickly secure a utility module to the galley cart.

Another aspect of the present invention provides a variety of utility modules adapted to be selectively installed on a galley cart in accordance with the intended use of the galley cart.

One other aspect of the present invention provides a module receptacle disposed either inside a body of the modular galley cart to receive a utility module therein or outside the body of the galley cart to receive a utility module thereon.

An object of the invention provides a modular galley cart having a monocoque body adapted to receive an extendable tablet module therein in a first configuration and adapted to receive the extendable tablet module thereon in a second configuration.

Another object of the present invention provides a modular galley cart available in a full size configuration, adapted to define two longitudinal openings, and available in a half size configuration, adapted to define at least one longitudinal opening; the full size configuration being adapted to accommodate two utility modules thereto.

An aspect of the invention provides a method to design a variety of galley carts having different features by using common parts on portions of the galley cart that do not need to be specialized to perform the intended task and change the parts that need to be specialized to perform the intended task to minimize the number of different parts.

One aspect of the invention provides galley cart utility modules adapted to be electrically or electronically connected to a counterpart. The counterpart could be a power supply disposed in the modular galley cart, embedded in a module receptacle or in the galley that docks the galley carts. The utility module connection is adapted to send/receive data and/or power.

One object of the invention provides a galley cart utility module having improved insulation properties to maintain goods therein at a desired temperature.

An aspect of the present invention provides a galley cart having a wheelbase module adapted to support the body of the galley cart when secured thereto.

Therefore, it is an aim of the present invention to provide an improved galley cart that is light, easy to manufacture and cost effective over the existing galley cart.

A modular utility cart comprising a body defining a door opening; wheels attached to a lower portion of the body for supporting the body; and a door operatively attached to the body and adapted to mate with the door opening, wherein the body is adapted to receive a utility module thereto.

A method of building a modular utility cart, the method comprising providing a body; selecting a utility module; and assembling the selected utility module to the body.

A modular utility cart kit comprising a utility cart comprising a body defining a door opening; wheels attached to a lower portion of the body for supporting the body; a door adapted to be pivotally attached to the body and further adapted to mate with the door opening; and a utility module adapted to cooperate with the body.

These and other advantages and features of the present invention will become apparent from the following description and the attached drawings.

DESCRIPTION OF EMBODIMENT(S) OF THE INVENTION

Figure 1:
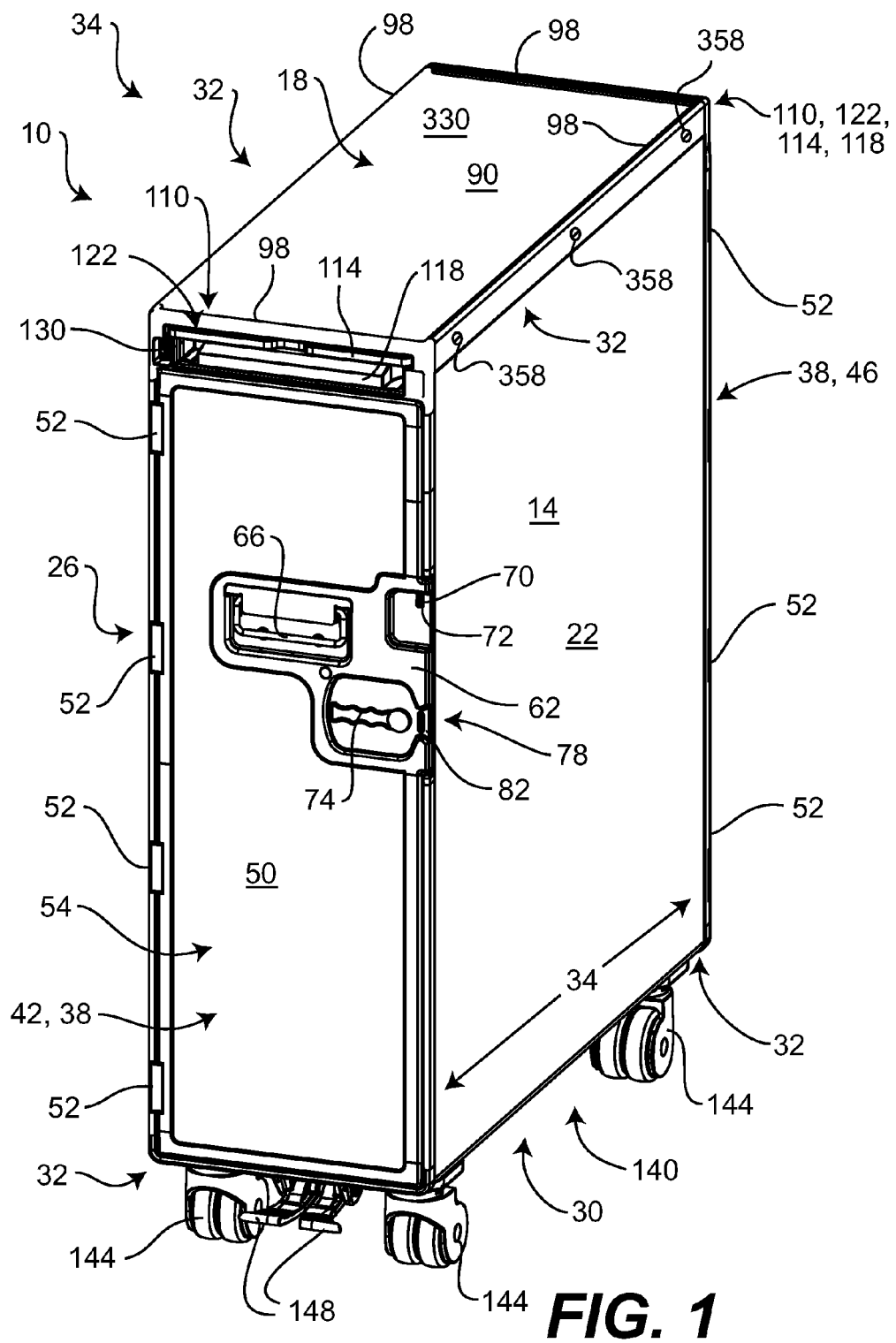
FIG. 1 is a perspective view of a full size galley cart in accordance with an embodiment of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in schematic form in order to facilitate describing the present invention.

A galley cart 10 adapted to carry goods in accordance with an embodiment of the invention is illustrated in FIG. 1. The galley cart 10 is adapted to be used in a passenger airplane but could alternatively be used in other environments like in a passenger train or, inter alia, in the medical field. The galley cart 10 illustrated in FIG. 1 comprises a body 14 defining an upper portion 18, a right lateral portion 22, a left lateral portion 26 and a bottom portion 30. The body 14 can be described as a monocoque construction 34 simultaneously providing the aesthetic envelope of the galley cart 10 and the structure that gives its mechanical strength. In other words, the monocoque construction 34 provides an envelope that is also the frame structure. As it will be described below in respect with at least one embodiment, the monocoque construction 34 uses a body 14 made of a single part.

The upper portion 18, the right lateral portion 22, the left lateral portion 26 and the bottom portion 30 of the body 14 are connected together in a continuous wall. Illustrative embodiments described herein are using radius portions 32 to interconnect adjacent portions 18, 22, 26, 30. The body 14 of the illustrated embodiment forms a tubular member having four planar side portions 18, 22, 26, 30 forming one part. The side portions 18, 22, 26, 30 can be secured together in one configuration while, alternatively, they can be made of a unitary part in another configuration. Both configurations can be defined as forming a monocoque structure. It can be appreciated that the wall thickness of the portions 18, 22, 26, 30 can have different thicknesses adapted to sustain the specific mechanical loads applied thereto. In other words, the monocoque construction 34 can be optimized to only use the required material at the right place and therefore reducing the weight of the galley cart 10 while providing the appropriate mechanical resistance thereto. For example, the upper portion 18 can have a thinner wall section than the bottom portion 30 because the upper portion 18 does not bear the weight of the entire galley cart 10. Additional details about the construction of the body 14 will be provided below.

Figure 4:
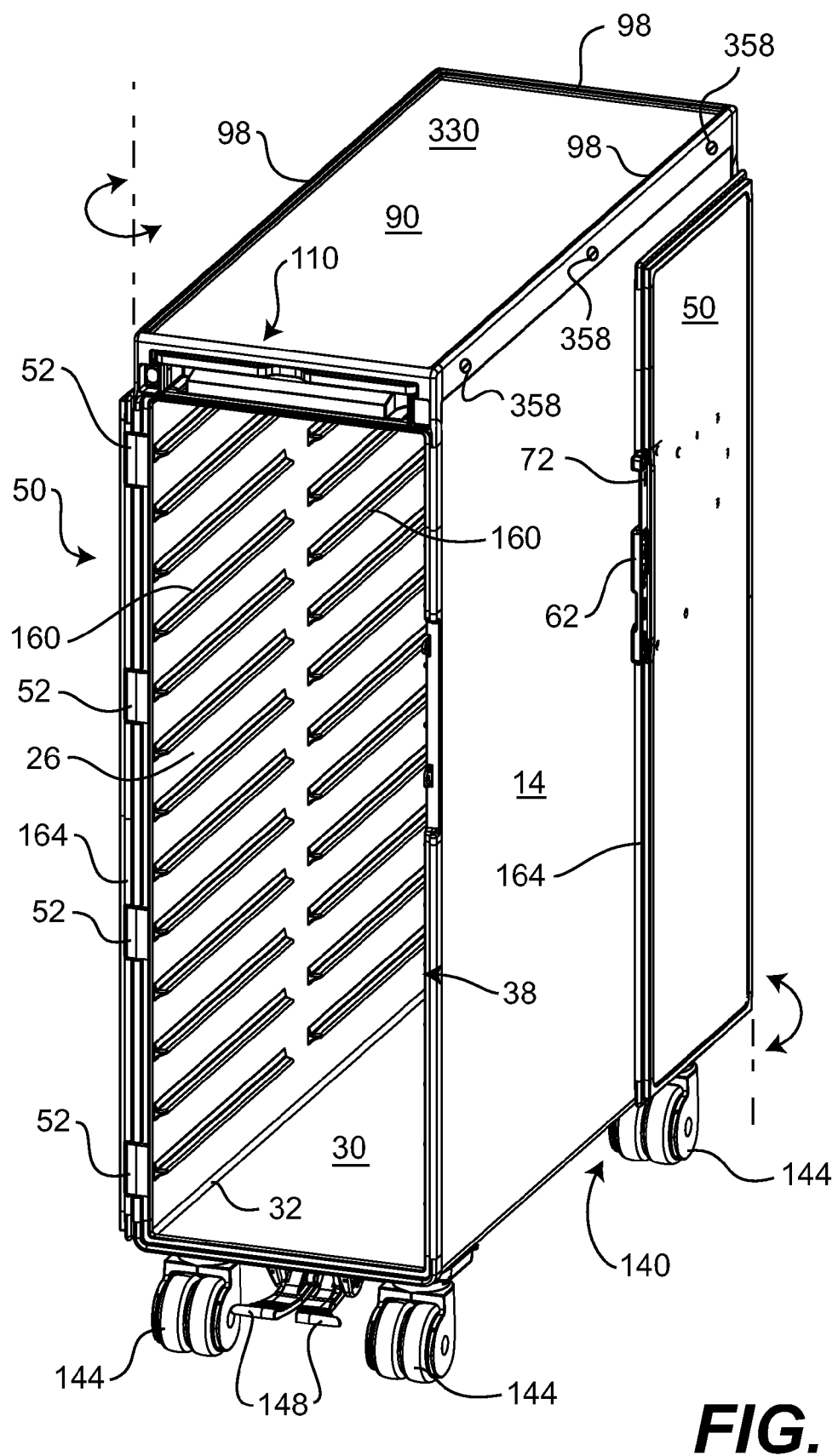
FIG. 4 is a perspective view of a full size galley cart with opened doors in accordance with an embodiment of the present invention.

The galley cart 10 illustrated in FIG. 1 is a full-size galley cart 10 having a predetermined longitudinal length 34 and provided with a door opening 38 on each longitudinal side 42, 46. Each door 50 is hingedly 52 connected to body 14 and is adapted to pivot between a closed position 54, when mating with its respective door opening 38, and an open position 58 as illustrated in FIG. 4. A reinforcement member 62 recessed into the door 50 provides support for a pulling handle 66 pivotally secured thereon and adapted to pull the door 50. A locking member 70 protruding from the door opening 38 and passing through a corresponding opening 72 in the door 50, when the door 50 is in the closed position 54, to receive a lock (not shown) thereon to prevent opening of the door 50 is also connected to the reinforcement member 62. A handle 74 is pivotally secured to the reinforcement member 62 to selectively disengage a retractable lock member 78 from a cooperating extending stem 82 to open the door 50. The handle 74 can be actuated in both directions to retract the lock member 78.

Still referring to FIG. 1, the galley cart 10 is provided with a cover element module 90 made of moulded plastic to cover the upper portion 18 of the body 14. The cover element module 90 is a portion of the galley cart 10 adapted to specialize the galley cart 10 for better performing specific tasks while keeping the remaining portions of the galley cart 10 substantially unchanged. The cover element module 90 of the present embodiment can be permanently secured to the body 90 with glue, or the like, to improve the shape of the upper portion 18 into a planar working area 94 defined by a peripherical ridge 98 configured to prevent objects or liquids to slide off the upper portion 18 of the body 14. Alternatively, the cover element module 90 is secured via a securing element 358.

Galley cart utility modules are portions of the galley cart 10 that can be changed for specializing the galley cart 10 without changing the whole galley cart 10. The module can be located at various positions on the galley cart 10 despite the illustrative examples presented herein are using the upper portion of the galley cart 10 to receive modules thereto. The modularity of the present invention can be directed to the galley cart manufacturing process by selecting the desired module at the time of permanently assembling the galley cart. The modularity of the present invention can equally be directed to ongoing modification to the galley cart 10 along its useful life by using non-permanent securing means to secure the module to the galley cart 10.

Continuing with FIG. 1, the bottom portion 30 rests on a wheelbase module 140 adapted to pivotally secure thereto four (4) sets of caster wheels 144. Two pedals 148 are also pivotally secured to the wheelbase module 140 to selectively lock or unlock the caster wheels 144 to immobilize the galley cart 10.

Figure 2:
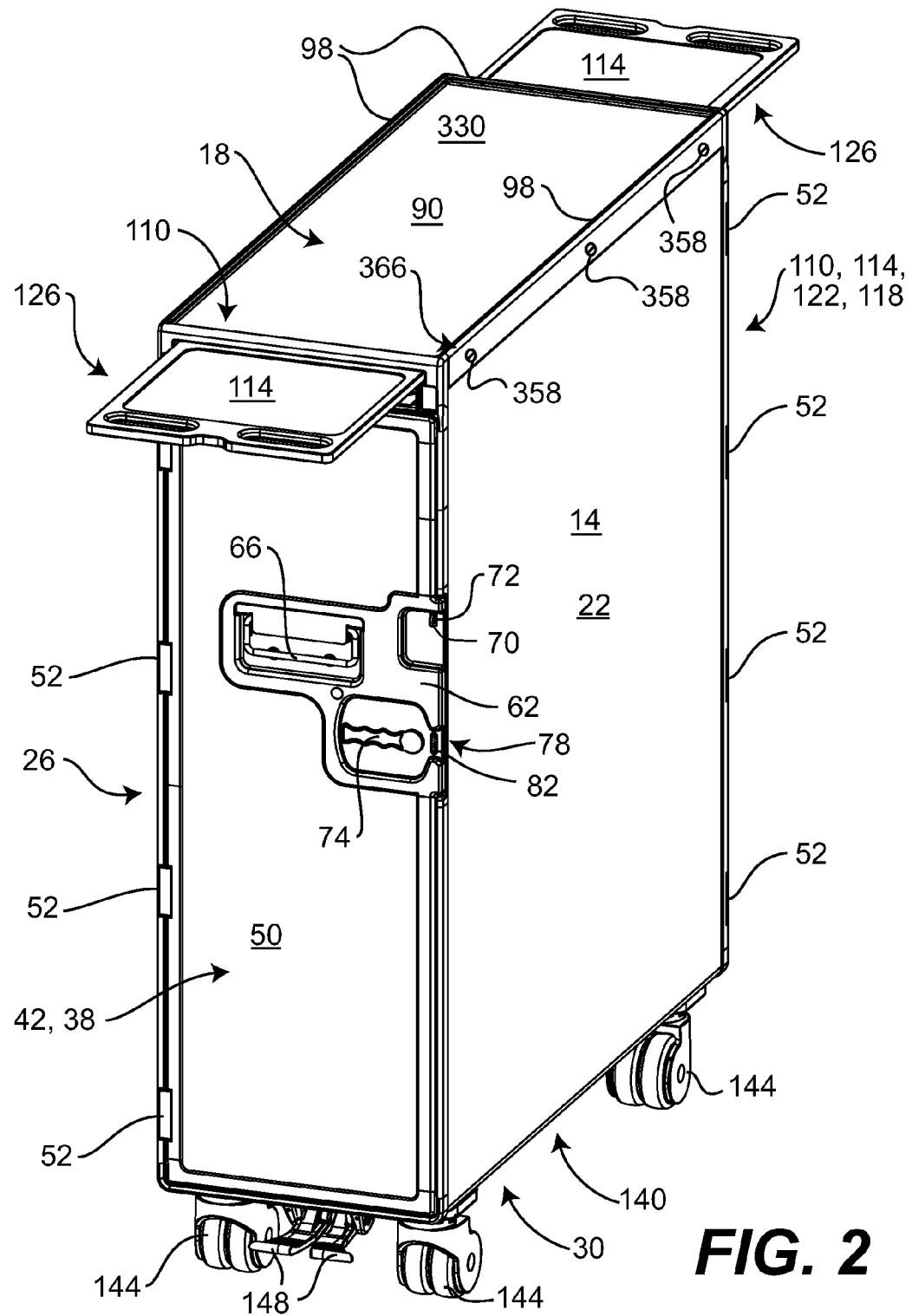
FIG. 2 is a perspective view of a full size galley cart in accordance with an embodiment of the present invention.

In the present embodiment, a tablet module 110 is secured inside the body 14, adjacent to the upper portion 18. The tablet module 110 of the illustrated embodiment comprises an extendable tablet 114 and an extendable receptacle 118. The extendable tablet 114 is moveable between a closed position 122 and an opened position 126 as it can better be appreciated in FIG. 2. A locking mechanism 130 prevents the extendable receptacle 118 to extend when undesired. Two handles 134 are defined in the extendable tablet 114 and are accessible when the extendable tablet 114 is slightly extended to drive the galley cart 10.

Figure 3:
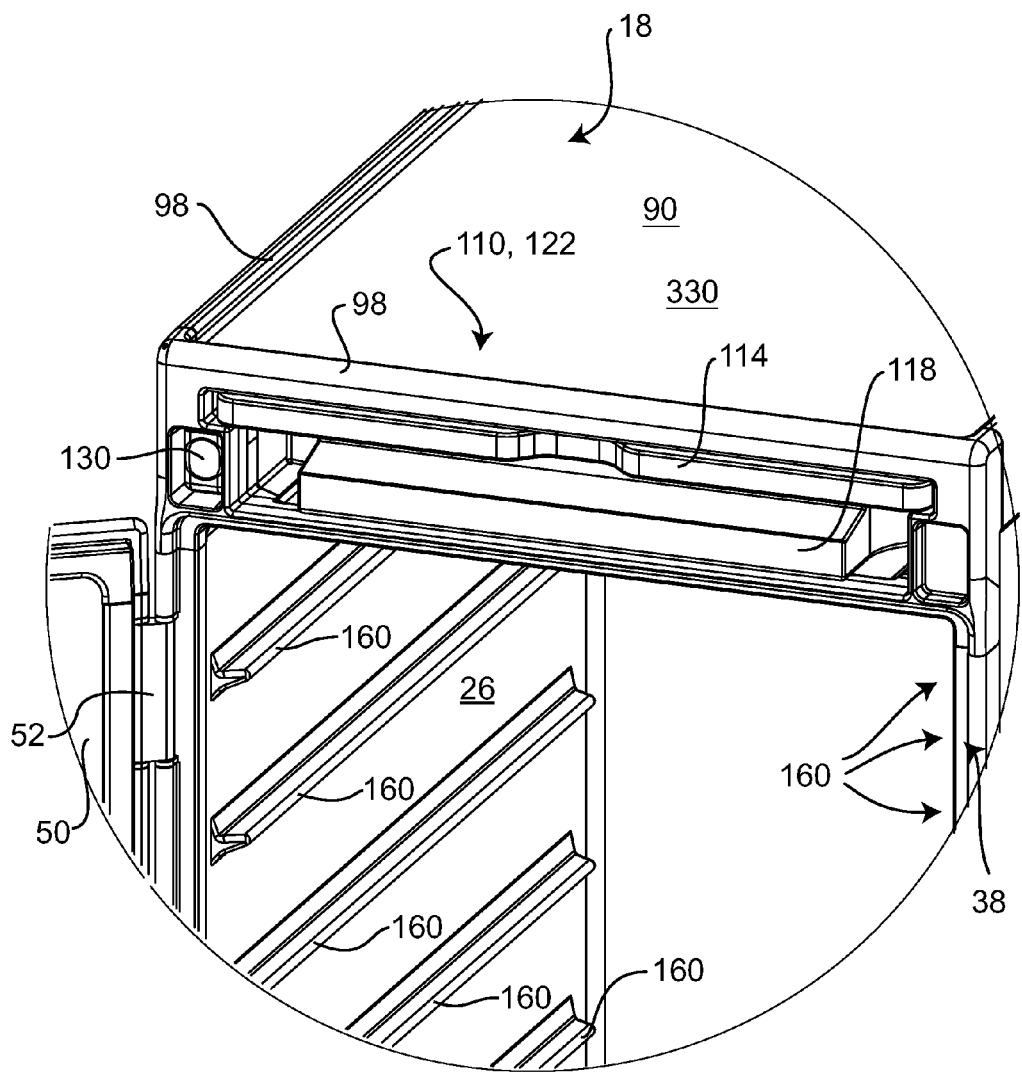
FIG. 3 is a magnified view of a tablet module of the galley cart of FIG. 1 in accordance with an embodiment of the present invention.

FIG. 3 is a magnified view of the tablet module 110. The semi-opened door 50 allows seeing the interior of the galley cart 10 where a series of parallel rails 160 are visible. The series of rails 160 are secured to the interior side of the lateral walls 22, 26 at a constant interval thereto to slideably receive receptacles (not illustrated) thereon. Dry ice (or means to cool) can be put in the extendable receptacle 118 to cool the interior of the galley cart 10. Openings (not visible) disposed on the lower portion of the extendable receptacle 118 are allowing cold air to pass through the extendable receptacle 118 and propagate to the rest of the body 14.

FIG. 4 illustrates the full size configuration galley cart 10 with the doors 50 in their respective opened position. Each door 50 can open in a position parallel to an adjacent lateral wall 22, 26. For doing so, the hinge 52 is provided with a double pivot axis adapted to distance the side of the door 50 from the door opening 38 and allow parallel proximity with one of the lateral walls 22, 26.

Figure 5:
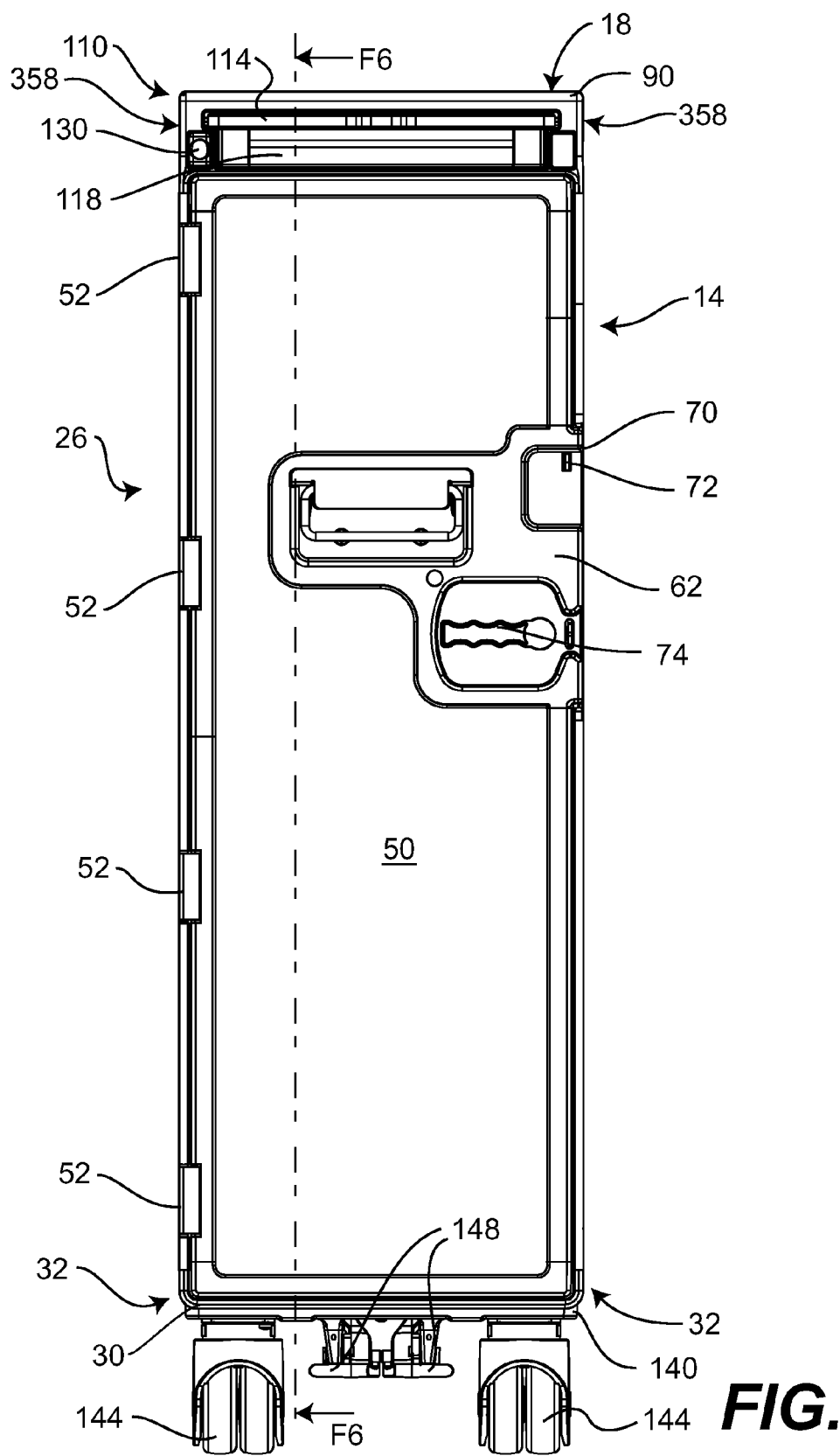
FIG. 5 is a front elevational view of the full size galley cart of FIG. 1 in accordance with an embodiment of the present invention.
Figure 6:
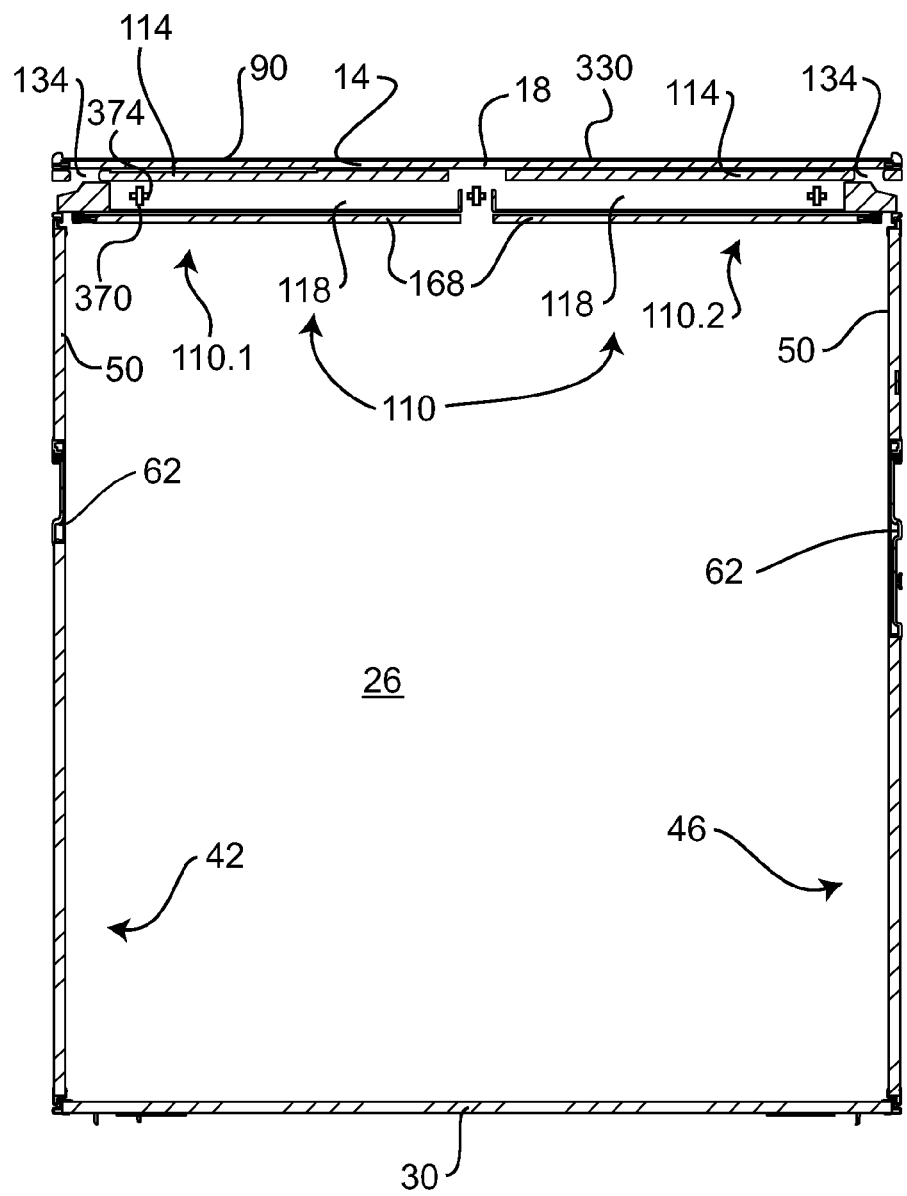
FIG. 6 is a right side elevational section view the full size galley cart of FIG. 1 in accordance with an embodiment of the present invention.

Turning now to FIG. 5 depicting the galley cart 10 and a section line representing the cut location of the section view illustrated in FIG. 6. FIG. 6 put further emphasis on the mechanical layout of the tablet module 110 inside the body 14. The full size galley cart 10 comprises two opposed tablet modules 110.1, 110.2. In other words there are two opposed extendable tablets 114 and two extendable receptacles 118 to respectively be used on each longitudinal side 42, 46 of the full size galley cart 10. Each tablet module 110 has a lower wall 168 sized and designed to be secured on each side to the lateral portions 22, 26. The tablet modules 110 of the present embodiment are located inside the body 14 of the galley cart 10. Alternatively, the tablet modules 110 could be located outside the body 14 on top of the upper portion 18 and covered by an appropriate cover element module 90.

Figure 7:
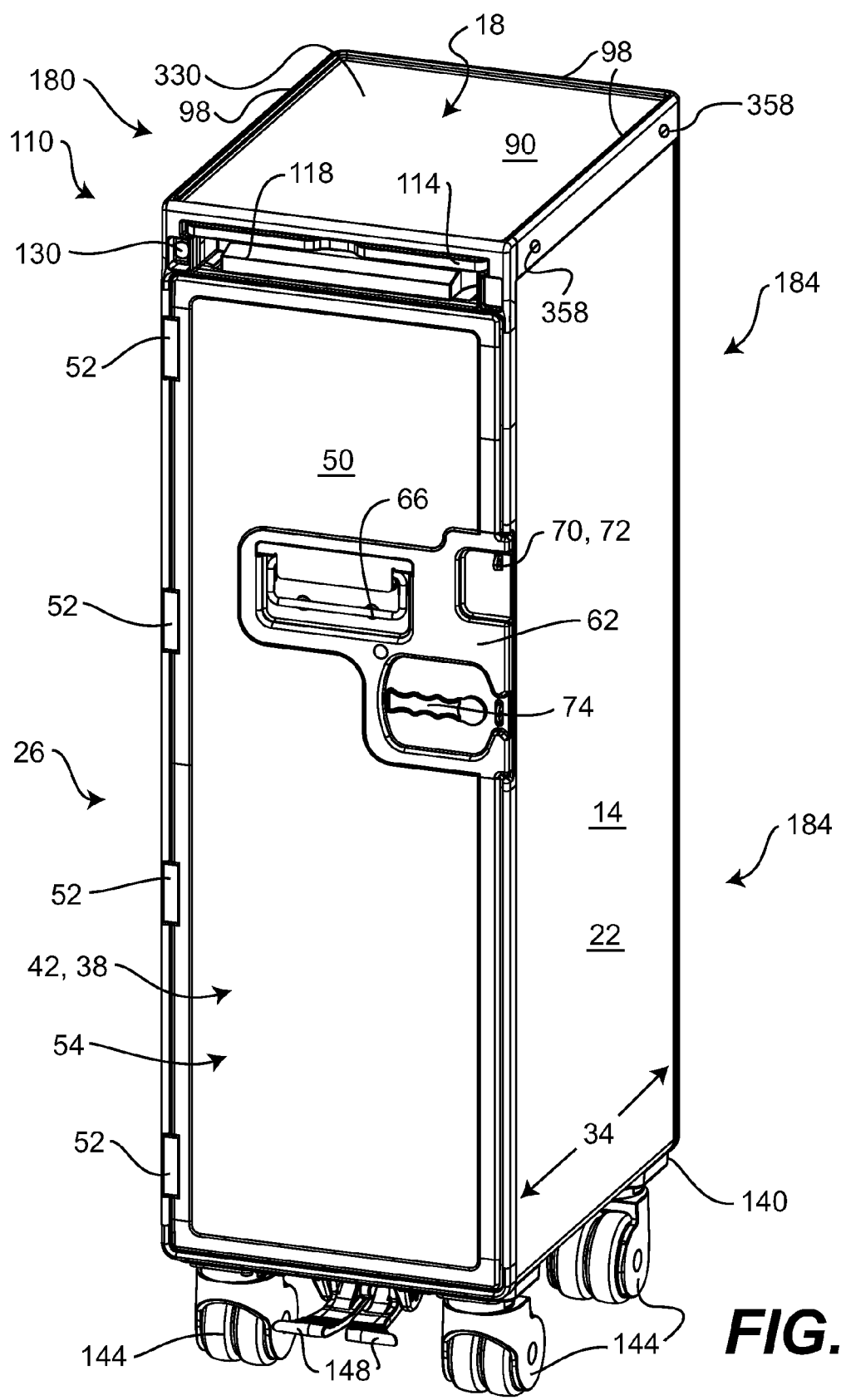
FIG. 7 is a perspective view of a half size galley cart in accordance with an embodiment of the present invention.

The full size galley cart 10 illustrated in FIG. 1 has a smaller counterpart. A half size galley cart 180, as illustrated in FIG. 7, has a smaller size due to its shorter longitudinal length 34. The smaller volume of the half size galley cart 180 can contain fewer goods therein but allows more nimble movements.

Figure 8:
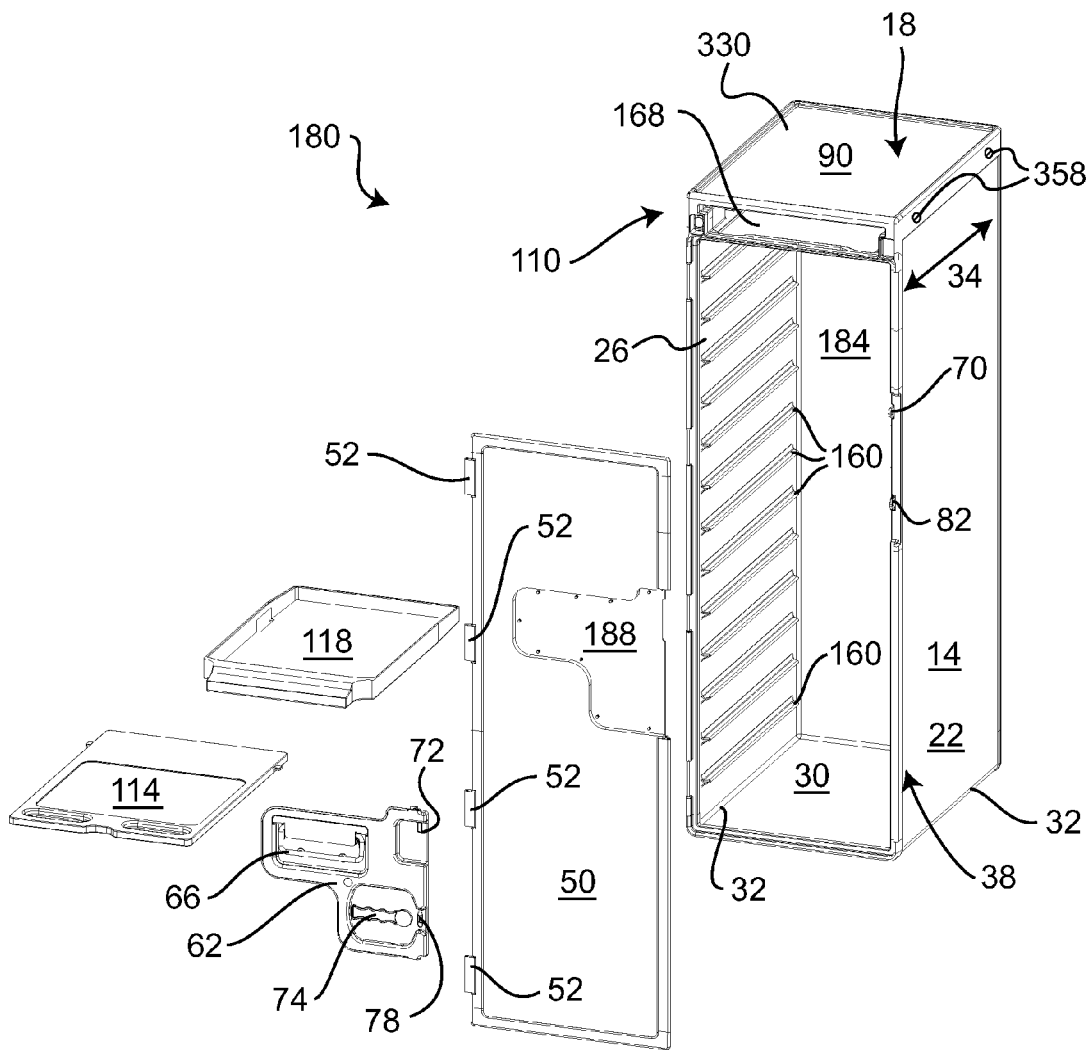
FIG. 8 is an exploded perspective view of a half size galley cart in accordance with an embodiment of the present invention.

As it is called, the half size galley cart 180 of the present embodiment is half the length of the full size galley cart 10. This is mainly obtained by reducing the length of the body 14 and the cover element module 90, by using a single tablet module 110, a single door 50 and closing the opposite longitudinal side with a back portion 184 that can better be appreciated in FIG. 8. The half size galley cart 180 is shown exploded in FIG. 8. Beside the shorter longitudinal length 34 the components of the half size trolley 180 are substantially similar as the components of the full size trolley 10. It can be seen on exploded FIG. 8 that the door 50 has a recessed portion 188 sized and designed to receive therein the lock member 62 such that the lock member 62 and the locking components located thereon do not extend above the external surface of the door 50.

Figure 9:
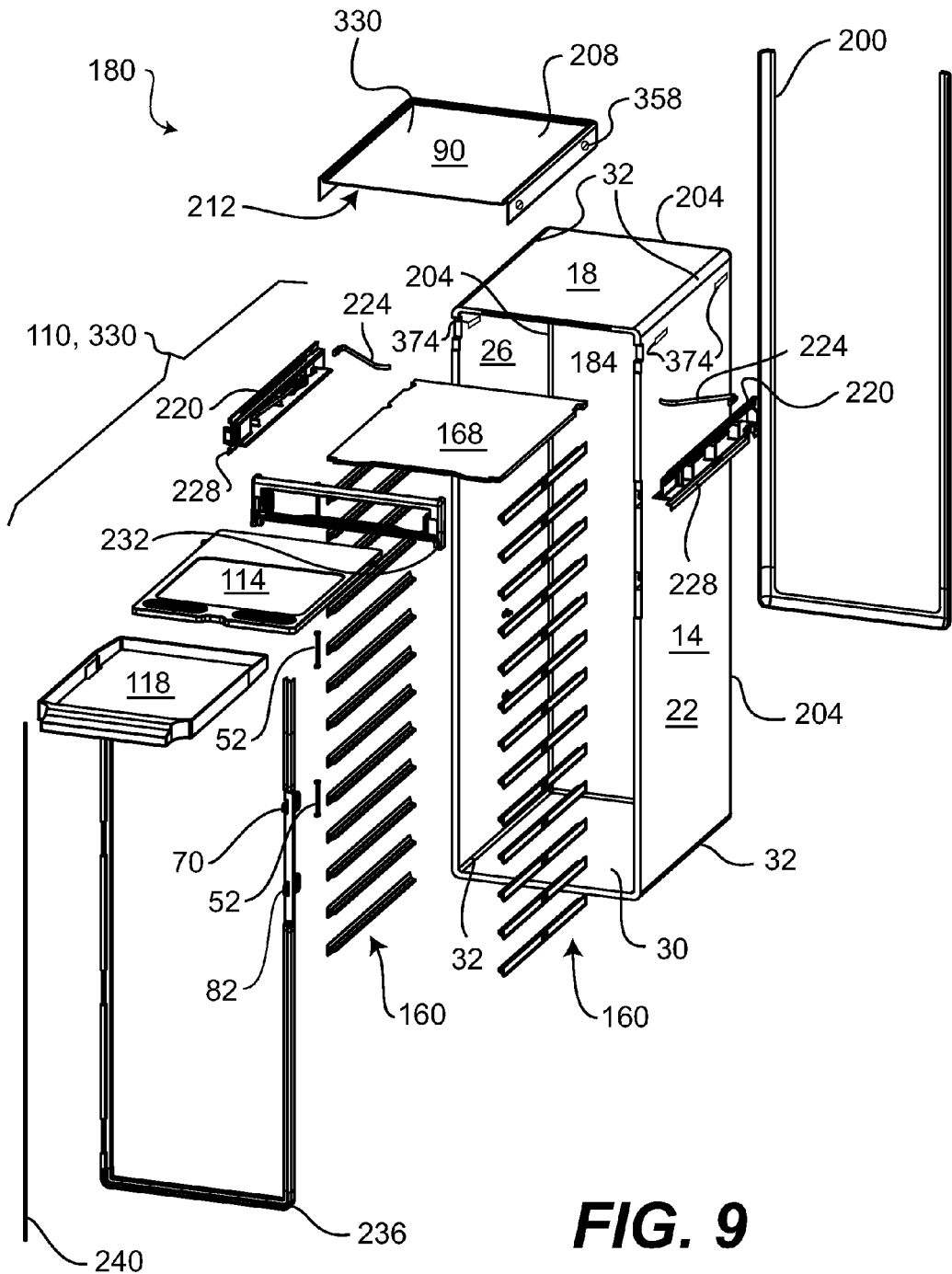
FIG. 9 is an exploded perspective view of a half size galley cart in accordance with an embodiment of the present invention.

FIG. 9 illustrates the half size galley cart 180 in a more detailed exploded view. Beginning from the back of the galley cart 180 it can be appreciated there is a resilient member 200 illustratively adapted to cover the rear edges 204 of the body 14. The resilient member 200 is preferably made of a material capable of absorbing shocks, like rubber or plastic. Additional resilient members can be added on other portions of the galley cart 180 if needed to protect the body, or other parts of the galley cart 180, against exterior objects that could damage the galley cart 180. The resilient member 200 is affixed to a half size galley cart 180 in the present embodiment but could also be used on the full size galley cart 10 without departing from the scope of the present invention.

The cover element module 90 used on a half size galley cart 180 is obviously smaller than the cover element module 90 adapted to be used in conjunction with a full size galley cart 10 as illustrated in FIG. 1. The cover element module 90 is preferably made of thermoformable or thermoset polymeric material because it is easy to shape, its low cost, its light weight and the additional features that could be added (i.e. ridges, grooves, logos . . . ). Anti-slip texture can be added on the upper surface 208 of the cover element to prevent objects to slip thereon, to help liquid to drain or to prevent undesired noise to be produced when objects are put thereon. Similarly, a texture could be added on the lower surface 212 to improve adhesion between the cover element module 90, the upper portion 18 and the side portions 22, 26 of the body 14. This might be desirable when the cover element module 90 is glued to the body 14.

Still in FIG. 9, the tablet module 110 is extracted from the interior of the body 14. The extendable tablet 114 and the extendable receptacle 118 are dismantled from the side guides 220 in which they operatively slide between their respective extended and retracted positions. The extendable tablet 114 and/or the extendable receptacle 118 are spring loaded with springs 124 located at the back of the tablet module 110 to facilitate their extensions when they are fully retracted in the body 14. A connection between one end of the spring 224 and its related side guide 220 locates the spring in a position where the spring 224 stores energy therein when the extendable tablet 114 and/or the extendable receptacle 118 are retracted in the body 14. The stored energy is restored when the locking mechanism unlocks the extendable tablet 114 and/or the extendable receptacle 118 from its recessed position to push the tablet or the receptacle out. It is provided by the present document to provide additional springs 224 in the tablet module 110 to preload an additional extendable tablet 114 and/or an additional extendable receptacle 118. Each side guide 220 is secured to the interior wall surface of the body 14 at the appropriate height. The side guides 220 of an embodiment of the present invention are glued to the body 14 using or not an intervening part 228. The present embodiment uses intervening parts 228 to interface between the side guides 220 and the body 14. These additional intervening parts 228 are desirable to better locate the side guides 220 before mounting the whole tablet module 110 in the body 14 as opposed to trying to secure the complete tablet module 110 in the body 14. This is very convenient, when the tablet module 110 is glued to the body 14, to glue the intervening parts 228 to the body 14 and maintain it with a jig, wait for the glue to cure and then secure the remaining parts of the tablet module 110 to the body 14. Another embodiment of the invention (not illustrated) uses fasteners to secure the side guides 220 to the body 14 therefore allowing the side guides 220 to be removed if needed. An alternate embodiment of the invention provides a removable securing mechanism allowing easy and quick removal of the side guides 220 to put some other features useful when the galley cart 180 is in use. A front panel 232 is located in front of the tablet module 110 and acts as a finishing element having an aesthetic value. In the present embodiment, the front panel defines an opening adapted to let the extendable tablet 114 and/or the extendable receptacle 118 pass through.

FIG. 9 also depicts a door opening frame 236 having a profile adapted to mate with edges of the body 14 on one side and to receive the door 50, in the closed position 54, on the other side—not illustrated in FIG. 9 but illustrated in FIG. 1. The door opening frame 236 is firmly anchored on the edge of the body 14 and is secured with an adhesive. In the illustrated embodiment the locking member 70 and the extending stem 82 are moulded in the door opening frame 236 to ensure sufficient stiffness and avoid transferring directly the load to the body 14. Alternatively, the locking member 70 and the extending stem 82 are glued to the door opening frame 236. Another embodiment firmly secures the locking member 70 and the extending stem 82 to the body 14 with fasteners and extends through associated openings performed in the door opening frame 236. Additionally, the door opening frame 236 further defines a portion of the hinge 52 pivotally securing the door 50 to the body 14. A hinge pivot 240 can be seen in FIG. 9. The long hinge pivot 240 is inserted through alternate openings in the door opening frame 236, the door 50 and the smaller hinge members associated with reference number 52 in FIG. 9.

Figure 10:
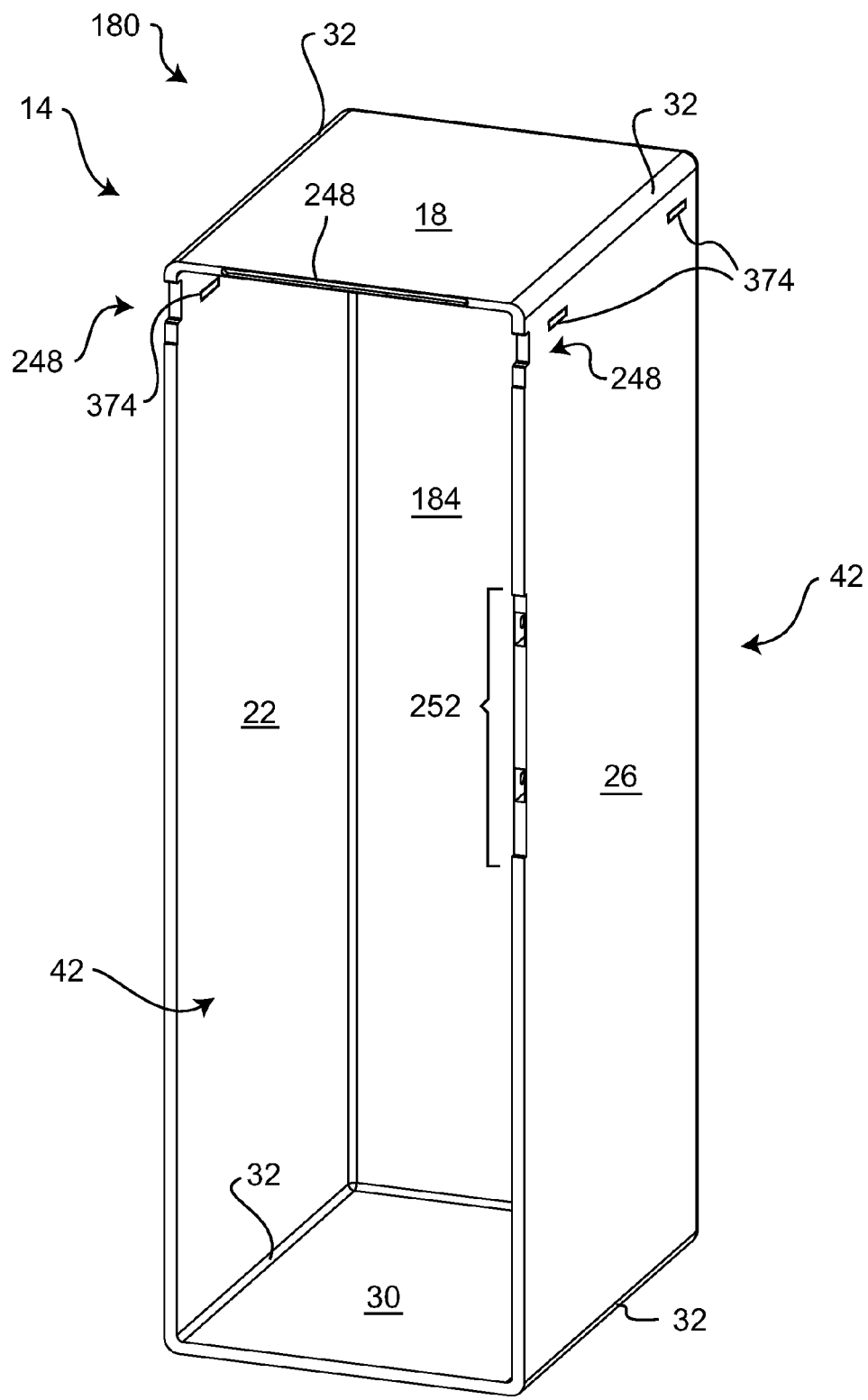
FIG. 10 is a perspective view of a body of a half size galley cart in accordance with an embodiment of the present invention.

Turning now to FIG. 10 illustrating an isolated body 14 defining the aforementioned upper portion 18, right lateral portion 22, left lateral portion 26, bottom portion 30 and, because this is the body of a half size trolley 180, a back portion 184. In one embodiment, the upper portion 18, right lateral portion 22, left lateral portion 26 and bottom portion 30, interconnected with radius portions 32, are made of a single part and the back portion 184 is connected to the hollowed body 14 afterward. This allows the hollowed body to have an extrusion-like shape before it is capped on one longitudinal side 42 to provide a half size galley cart body 14. Conversely, as explained above in reference with the full size galley cart 10, the upper portion 18, right lateral portion 22, left lateral portion 26 and bottom portion 30 interconnected with radius portions 32 are forming the body 14 of the longer galley cart 10.

The upper portion 18, right lateral portion 22, left lateral portion 26, bottom portion 30 are made of composite materials to provide a strong mechanical resistance yet light weight galley cart 10, 180. Composite materials are commonly known as a fiber reinforcement fixed with a resin matrix. The composite material is advantageous for its lightweight; its structural benefits and for its thermal efficiency thus providing a good thermal barrier between the inside of the galley cart 10 and the outside.

The present application utilizes a liquid Phenolic resin system to infuse dry fabrics (e.g. fibers, reinforcement material, ... ) in the composite layup by means of vacuum infusion moulding. This enables to reduce the costs of materials while still enabling to mould the composite sandwich layup in a shape of a finished trolley. Additionally, Phenolic resin meets the safety requirement for aviation applications.

Vacuum Infusion Process (VIP) is a common resin infusion fabrication method usable with Phenolic resin that uses vacuum pressure to drive resin into dry fiber-reinforcement material. Materials are laid up dry into the mold and the vacuum is applied before resin is introduced. Once a complete vacuum is achieved, resin is literally sucked into the laminate via carefully placed resin-feed lines. The resin infusion process has been identified as a cost-effective fabrication technique for producing damage tolerant textile composites. Dry textile preforms are resin impregnated, consolidated and cured in a single step eliminating costly prepreg tape manufacture and ply-by-ply layup. VIP uses vacuum bag that is not reusable. The bag is placed over the part and is sealed around the perimeter of the mold with tacky-tape. The layup of material in the VIP consists of fiberglass woven cloth layers; a foam core; Phenolic resin and vacuum bagging accessories.

Continuing with FIG. 10, the forward edge 244 of the body 14 is shaped 248 to accommodate the front panel, on its upper portion 18 and lateral portions 22, 26. Additional forms 252 are performed on the right lateral portion 26 to receive the locking member 70 and the extending stem 82 as taught in an embodiment of the invention. Other forms could be performed on the body 14 to suit various other needs without departing from the scope of the present invention.

Figure 11:
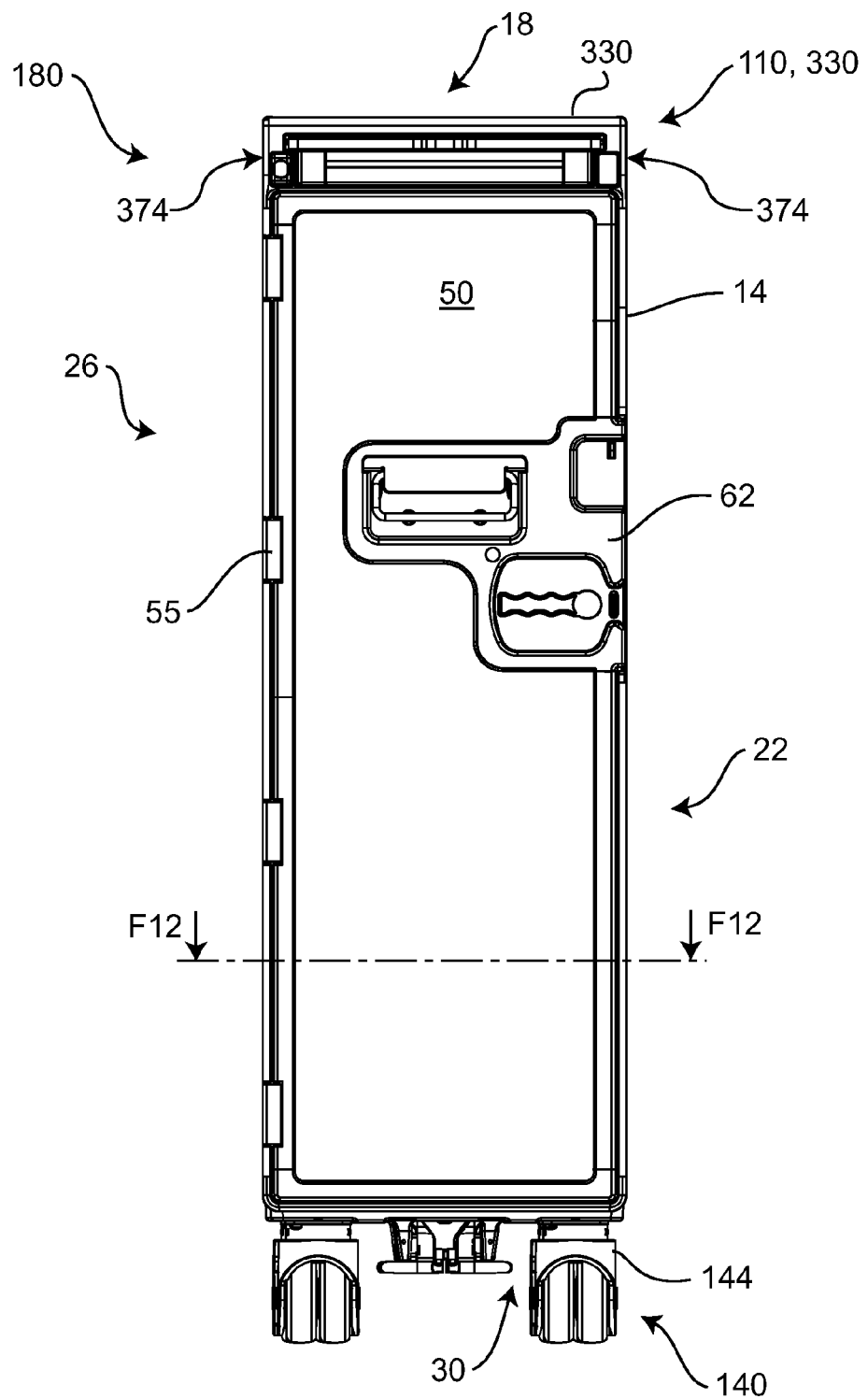
FIG. 11 is a front elevational view of a half size galley cart in accordance with an embodiment of the present invention.
Figure 12:
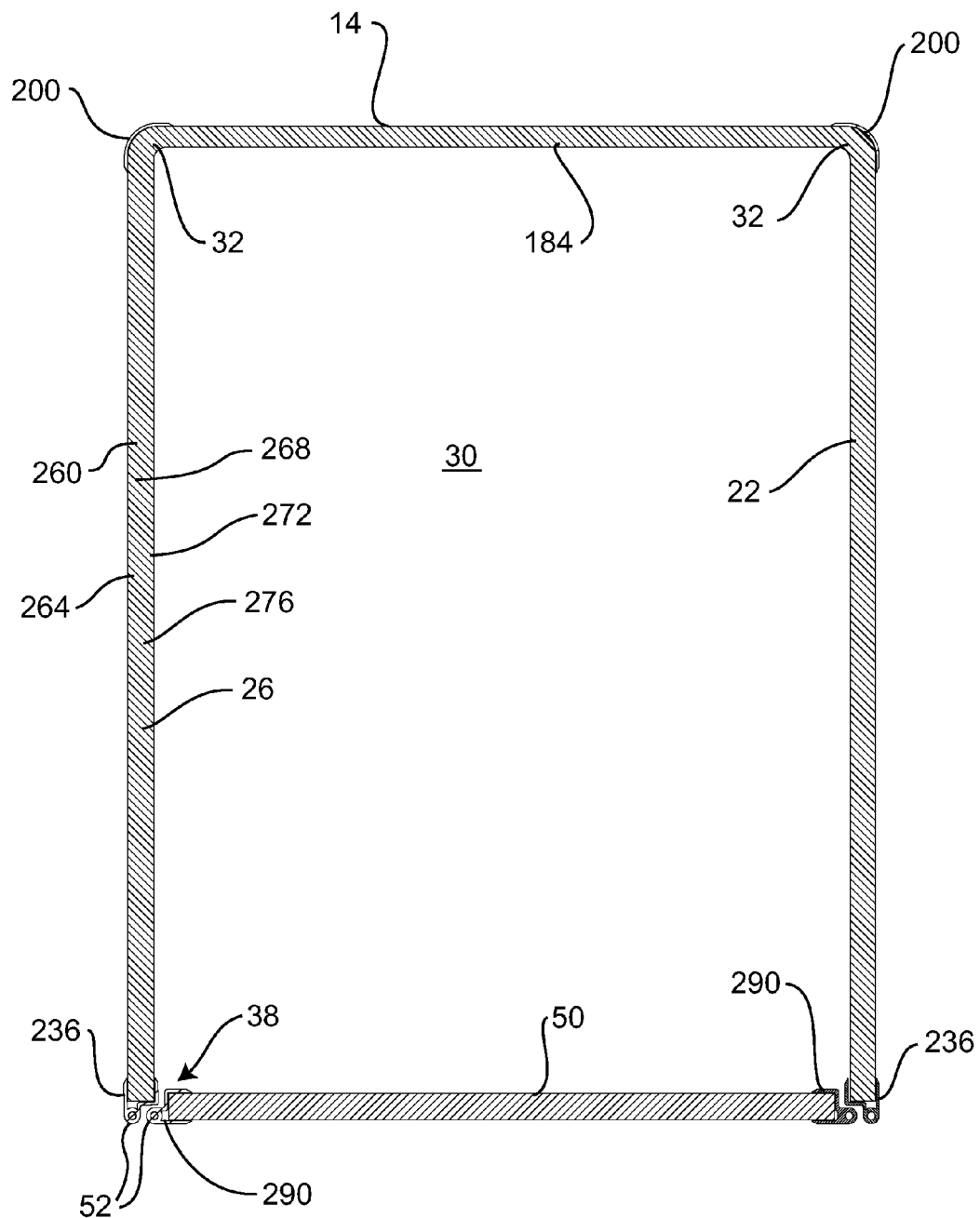
FIG. 12 is a sectional top plan view of a half size galley cart in accordance with an embodiment of the present invention.

FIG. 11 is an illustration of a half size galley cart 180 with an indication of the section area used by following FIG. 12 where it is possible to appreciate in more details the composition of the composite materials used in the galley cart body 14. This top plan view depicts the continuity between the left lateral portion 26, the back portion 184 and the right lateral portion 22. The radius portions 32 ensuring the composite wall continuity are well shown in FIG. 12 with their respective resilient member 200. The composite materials comprise, in an embodiment of the invention, a sandwich structure of an exterior finishing layer 260 used to protect the body 14 and improve its resistance to contacts with exterior objects while giving an alternate aesthetic finish to the body 14. An exterior layer 264 of fibers and Phenolic resin comes next with a core 268 having the role of distancing the interior layer 272 of fibers and Phenolic resin thus increasing the stiffness of the structure. An interior finishing layer 276 used to protect the body 14 and improve its resistance to contacts with interior objects.

Figure 13:
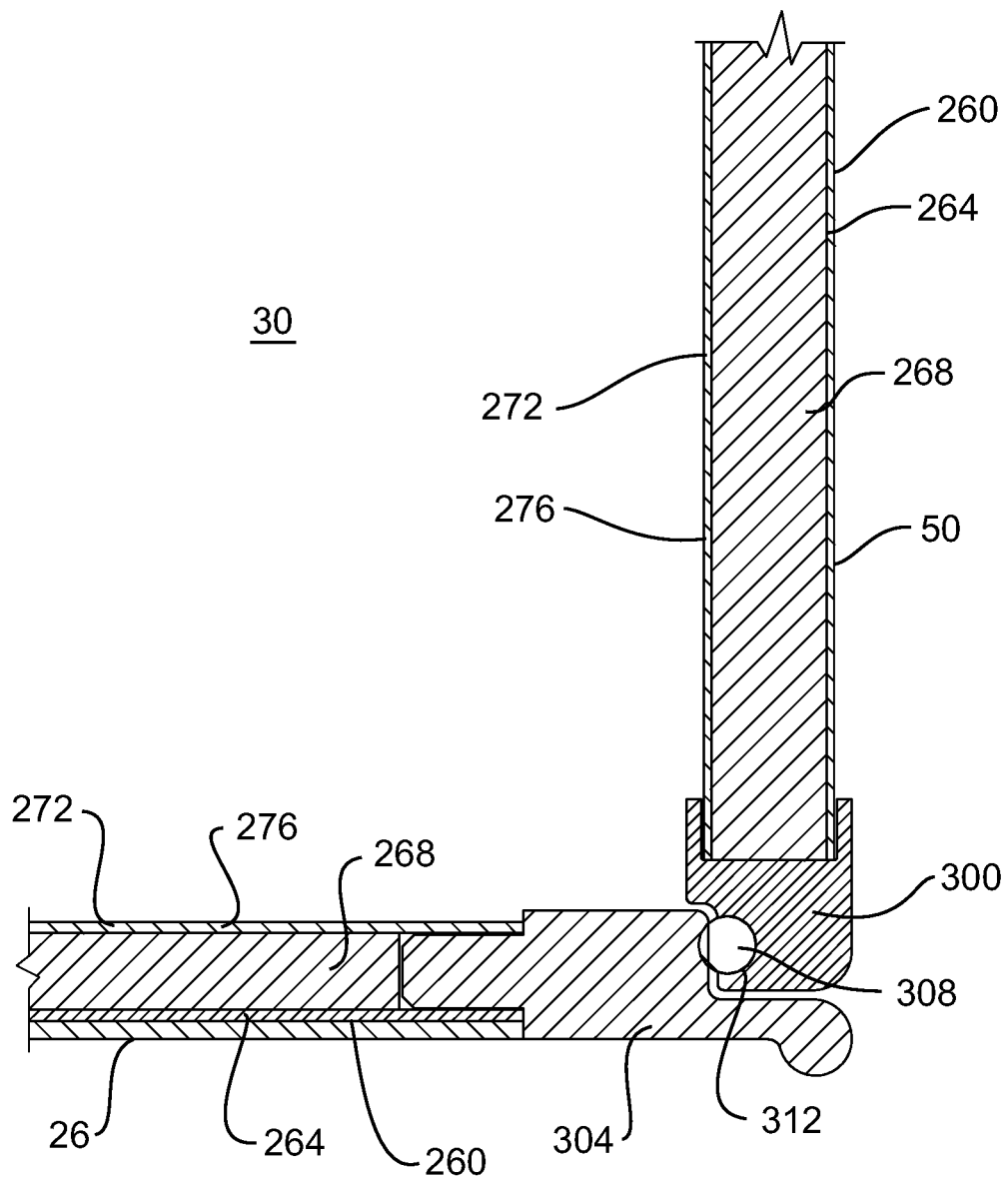
FIG. 13 is a sectional view of a portion of a door closure mechanism of a galley cart in accordance with an embodiment of the present invention.

Still in reference with FIG. 12, one can appreciate that the door opening frame 236 of the door opening 38 and the door contour frame 290 are made of the same extruded material. In this embodiment of the invention the same extruded shape is complementarily used for the door opening frame 236 and the door contour frame 290. The use of a single extruded shape simplifies the assembly and reduces the tooling cost. The shape of the extrusion depicted in FIG. 13 is one workable design. The extruded material is aluminum although other equally suitable material could be used and still be considered within the scope of the present invention (e.g. plastic).

An alternate embodiment of the interface between the door opening frame 236 of the door opening 38 and the door contour frame 290 is illustrated in FIG. 13. Two different shapes of extrusion 300, 304 are used in this embodiment and a seal 308 (an "O" ring) has been inserted in a groove 312 properly sized and designed. This type of design improves the sealing of the door 50 with the body 14 to help improve thermal efficiency of the galley cart 10, 180.

Figure 14:
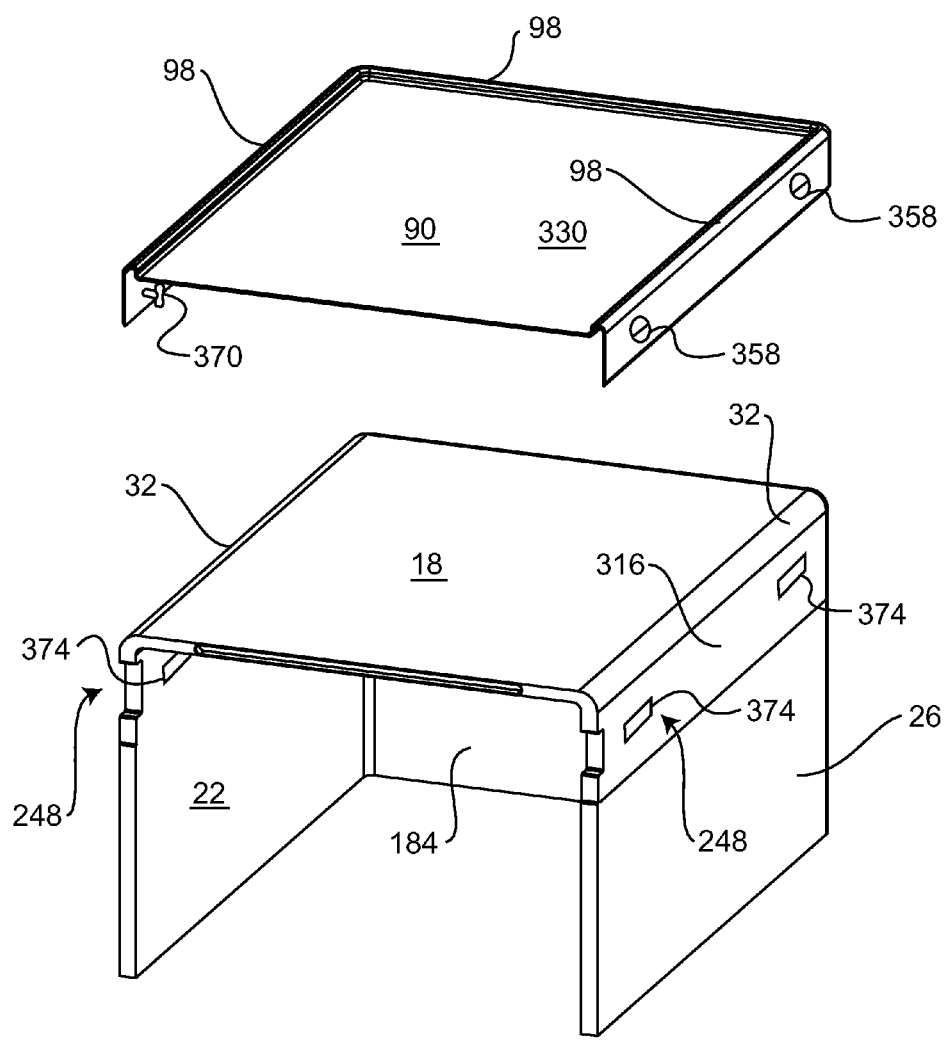
FIG. 14 is a magnified view of a upper portion of a half size galley cart in accordance with an embodiment of the present invention.

Moving now to FIG. 14 illustrating a more detailed exploded view of the cover element module 90 with the upper portion 18 of the body 14. The cover element module 90 is designed to slide fit the upper portion of the body 14 and be secured thereto with glue or fasteners. A recessed portion 316 having a depth equivalent to the thickness of the cover element module 90 wall can optionally be performed in the body 14 to ensure an even exterior finish to reduce the risk of hooking exterior objects, like cloths or seat fabric material, when the galley cart 10, 180 is used. The cover element module 90 can alternatively be considered a utility module 330 in accordance with at least one embodiment as it will be discussed later in this specification.

Figure 15:
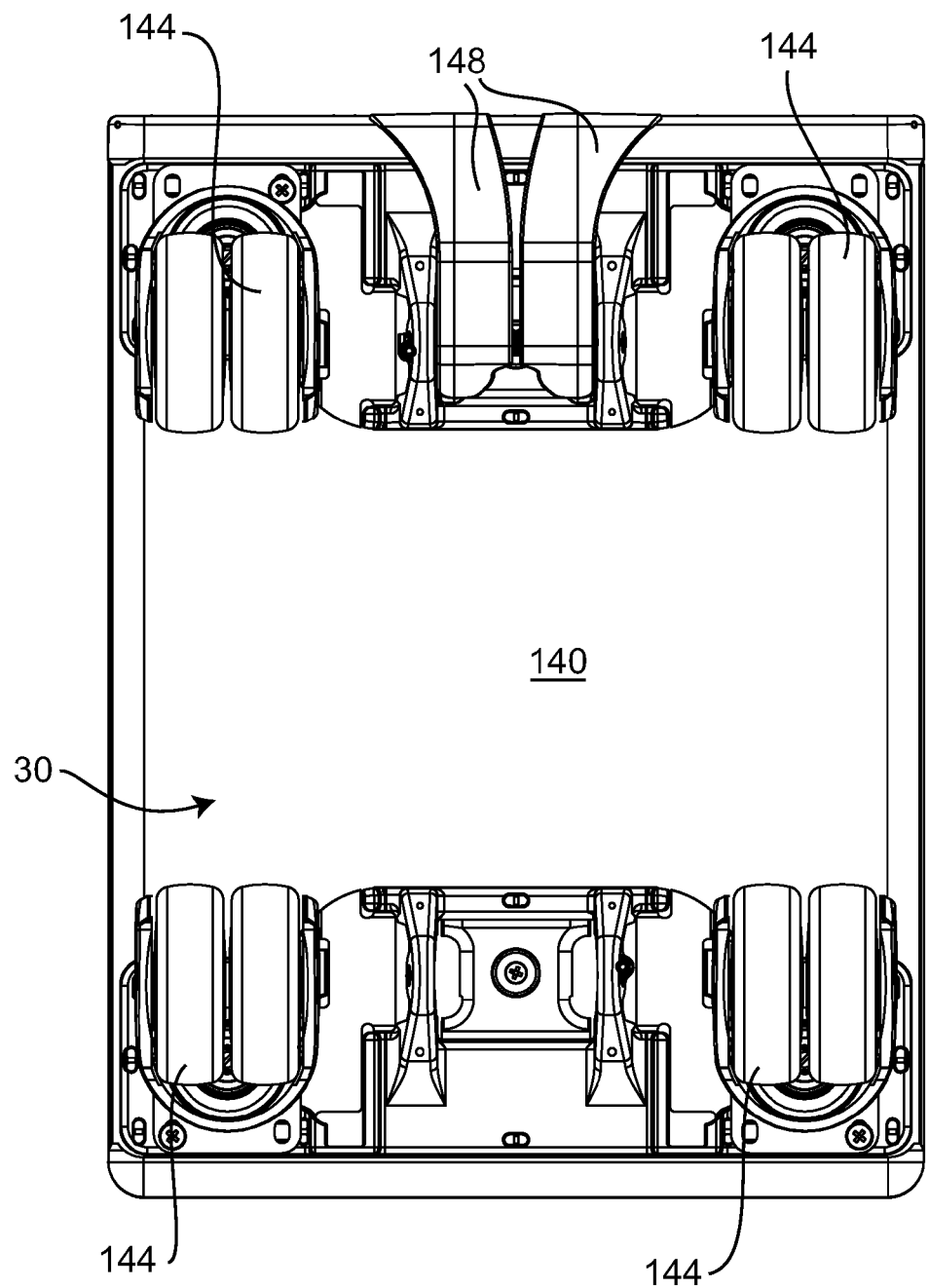
FIG. 15 is a bottom plan view of a half size galley cart in accordance with an embodiment of the present invention.

One embodiment of the invention providing a wheelbase 140 adapted to secure caster wheels 144 thereon is shown in FIG. 15. The wheelbase 140, as presented by the present embodiment, is a rigid panel helping distributing the mechanical load from the body 14 to the caster wheels 144. The wheelbase 140 can be glued or secured with fasteners to the bottom portion 30 of the body 14. An alternate embodiment directly secures the caster wheels 140 to the body 14 and a reinforcement plate (not illustrated) disposed inside the body 14 adjacent to the bottom portion 30. The reinforcement plate help distributes the load to the complete bottom portion 30. A quick release mechanism could alternatively be used to easily install and remove the wheelbase 140 from the body 14. The quick release mechanism is a set of three grooved members disposed under the bottom portion 30 and configured to slide therein the wheelbase 140. A locking mechanism is provided to prevent the wheelbase 140 to slide out of the quick release mechanism. Otherwise, the caster wheels 144 can be directly mounted to the body 14 if the strength of the body 14 is sufficient. Here again, the wheelbase 140 can also alternatively be considered a utility module 330 as described below.

Figure 16:
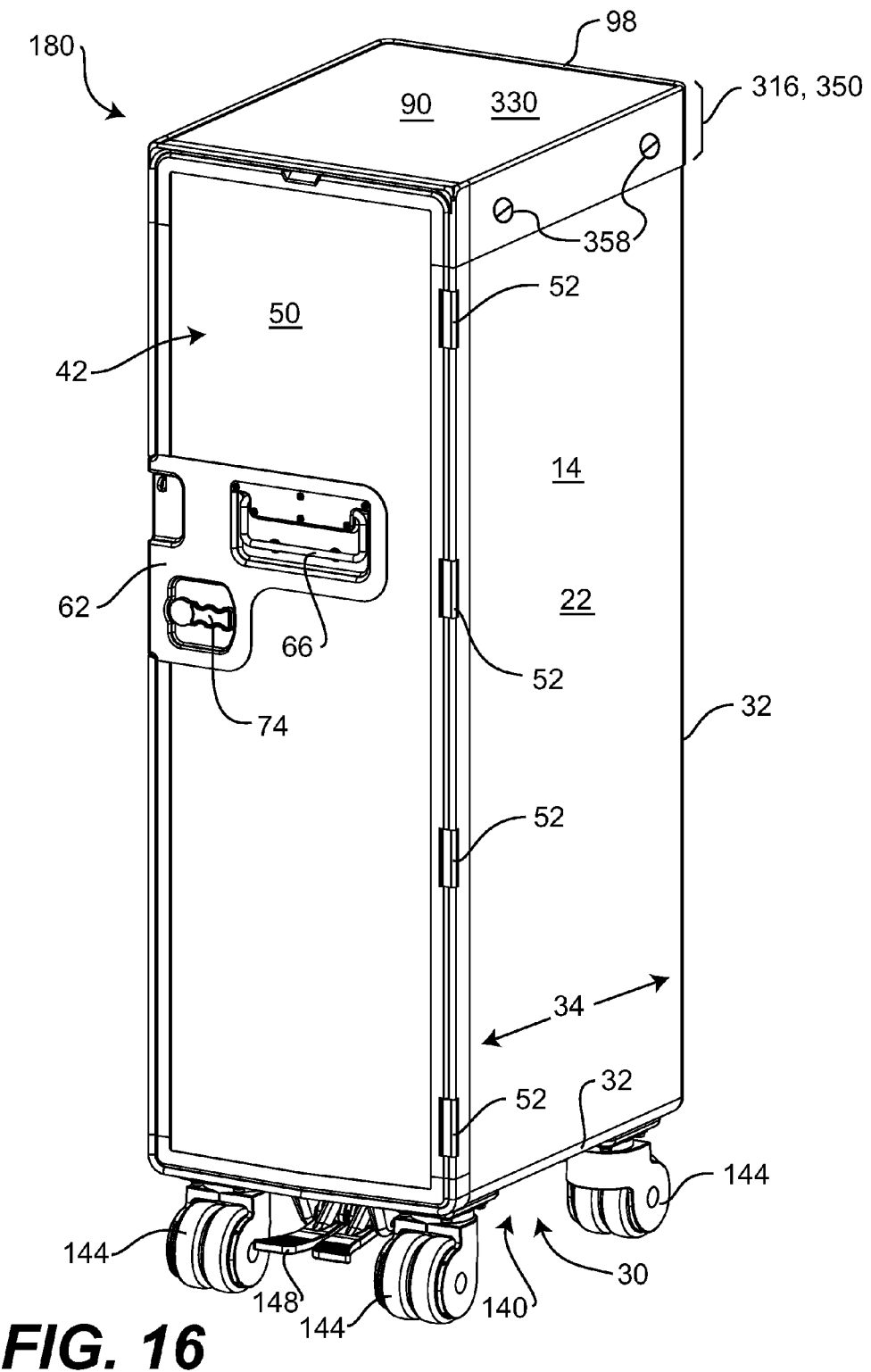
FIG. 16 is a perspective view of a body of a half size galley cart in accordance with an embodiment of the present invention.
Figure 17:
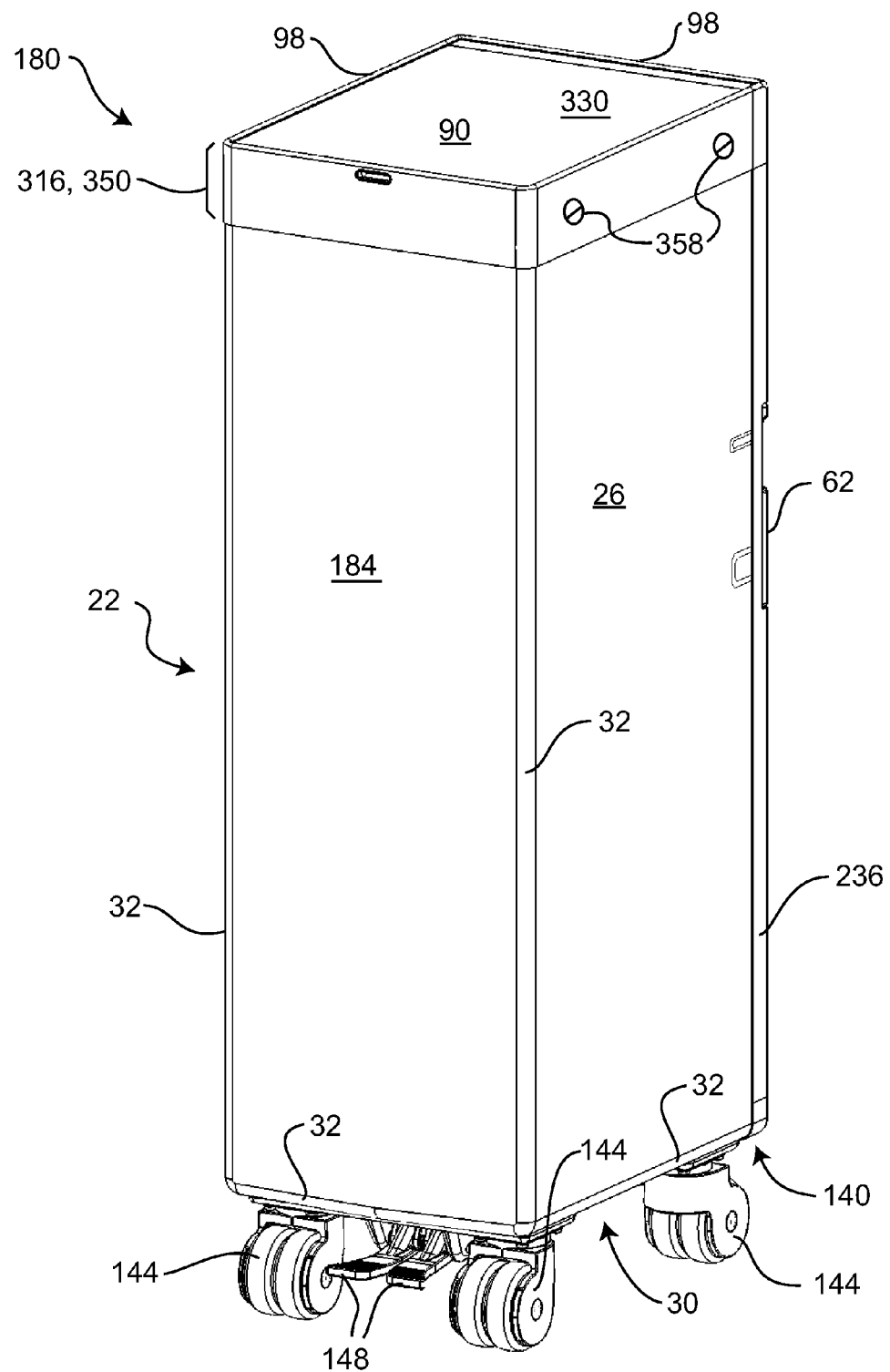
FIG. 17 is a rear perspective view of a body of a half size galley cart in accordance with an embodiment of the present invention.

FIG. 16 and FIG. 17 are illustrating another embodiment of the invention. The half size galley cart 180 presented herein does not have a tablet module 110 therein. The body 14 of the half size galley cart 18 uses the entire volume for receiving goods therein. The door 50 consequently covers the complete longitudinal opening 42 and gives access, when opened, to the complete internal volume of the body 14.

Figure 18:
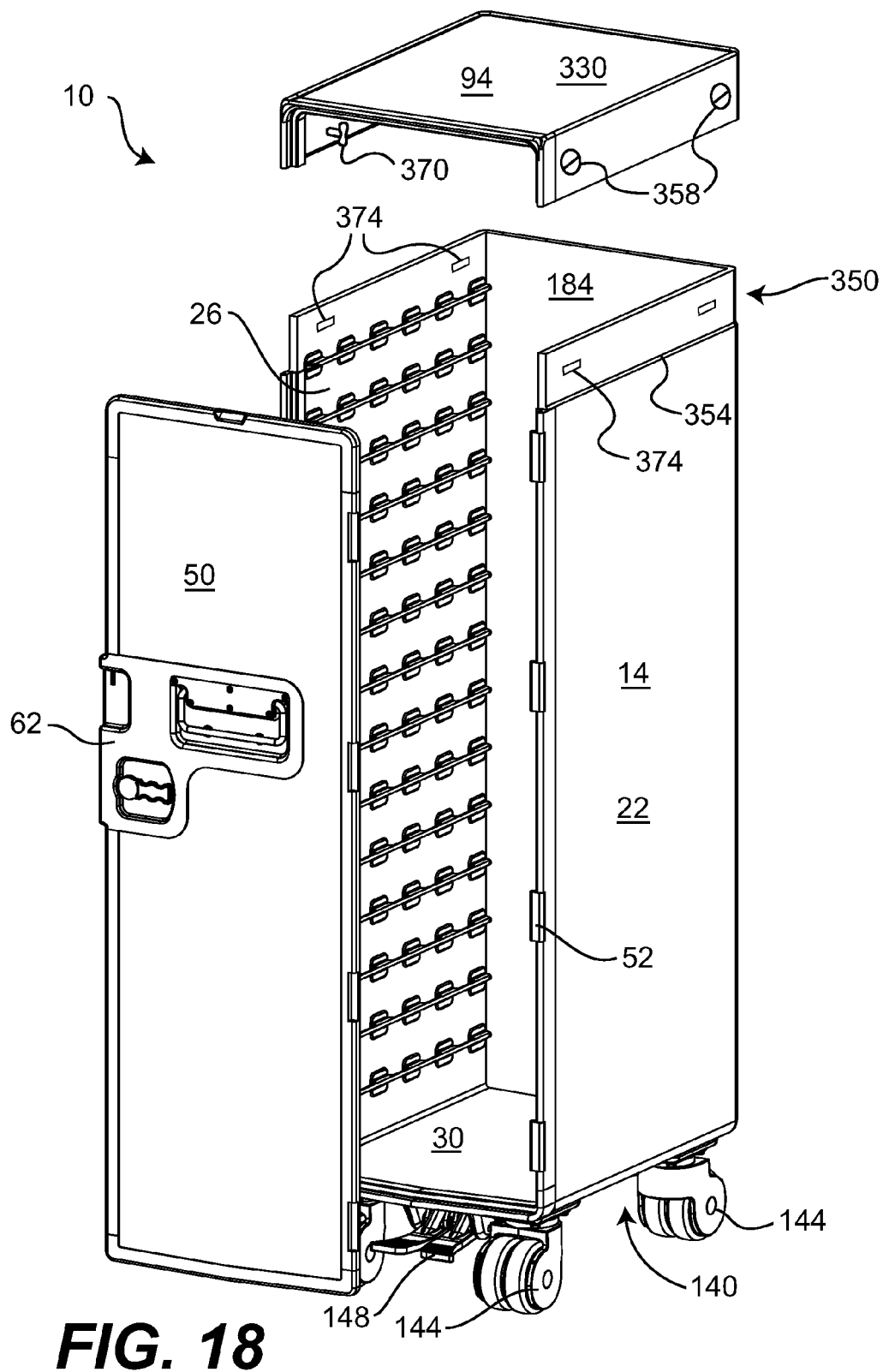
FIG. 18 is a perspective exploded view of a body of a half size galley cart in accordance with an embodiment of the present invention.

Turning now to FIG. 18 illustrating an alternate embodiment of a modular galley cart 10 provided with a body 14 and a utility module 330. The utility module 330 in accordance with embodiments of the invention is used to specialize the galley cart 10 for performing a task. The utility module 330 is adapted to be removably connected to the body 14 such that many utility modules 330 can be used in conjunction with a single body 14.

As explained in connection with the embodiment illustrated in FIG. 1, the utility module 330 can be directly connected to the body 14. Alternatively, the body 14 is equipped of a module receptacle 350 to quickly remove/connect the utility module 330 to the body 14. The module receptacle 350 provides a positioning element 354 and the securing element 358 to locate the utility module 350 in respect with the body 14 and to secure the utility module 350 to the body 14. The embodiment of FIG. 18 illustrates a positioning element 354 in the shape of an edge 354 on which rests the cooperating edge 362 of the utility module 350. The securing element in the embodiment of FIG. 18 is a rotating clip 366 provided with a "T" shaped fastener 370 sized and design to cooperate with slots 374 provided in the body 14. Turning 90 degree the rotating clip 366 locks the "T" shape fastener 370 in their respective cooperating slots 374. For example, the securing element 366 can be a quarter turn assembly fastener as illustrated in Spaenaur catalog, page L36, L37, Spaenaur number 110-064 that can be found at http://www.spaenaur.com/view_pdf.asp?Page=L37 with its mating member. Please note that the upper portion 18 has been removed on FIG. 18 to allow a better view of the body's 14 interior.

There are many possible utility modules 330 as illustrated in the following Figures. They each have their unique configuration to provide a desired set of functions. Each of these utility modules 330 is adapted to mate with the module receptacle 350 as explained above.

Figure 19:
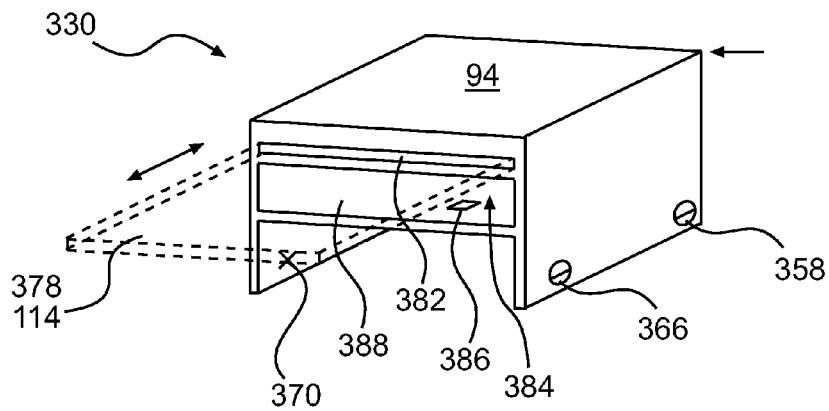
FIG. 19 is a perspective view of a utility module in accordance with an embodiment of the present invention.

FIG. 19 is a utility module provided with a longitudinally extending working area 378 that extends from the utility module 330 from an opening 382. The longitudinal extending working area 114 increases the size of the planar working area 94 on one longitudinal side or on both longitudinal sides of the modular galley cart 10. A dry ice (or means to cool) compartment 384 is disposed under the longitudinally extending tablet 114 to receive dry ice therein to cool the interior of the modular galley cart 10. Openings 386 disposed on the lower portion 388 of the dry ice compartment 384 are allowing cold air to pass through the utility module 330 and move to the body 14. The dry ice compartment 384 is also adapted to be closed such that cold is not lost outside the galley cart 10.

Figure 20:
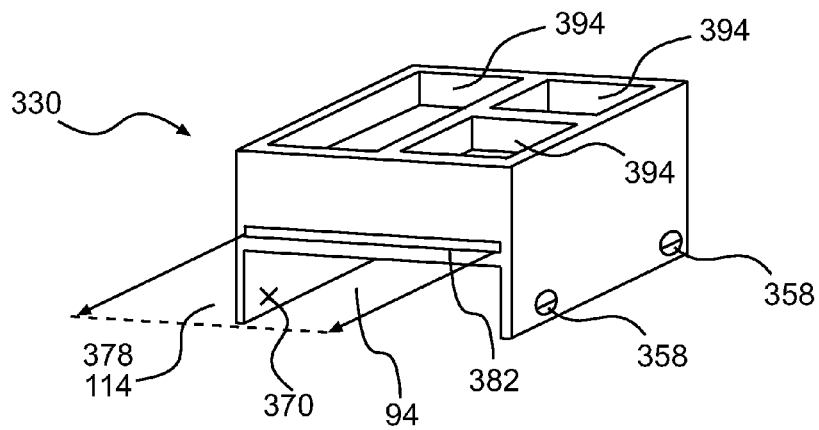
FIG. 20 is a perspective view of a utility module in accordance with an embodiment of the present invention.

FIG. 20 illustrates another exemplary utility module 330 provided with a series of boxes 394 formed therein. Each box 394 is sized and designed to receive a desired good therein or to serve a particular function. The number of boxes 394, as well as their respective size and location, can vary without departing from the scope of the present invention. Additional planar working area 94 is optionally provided with the extension of the longitudinally extending working area 378. This illustrative module and its components thereof can be manufactured in injected plastic or with any other suitable material and process.

Figure 21:
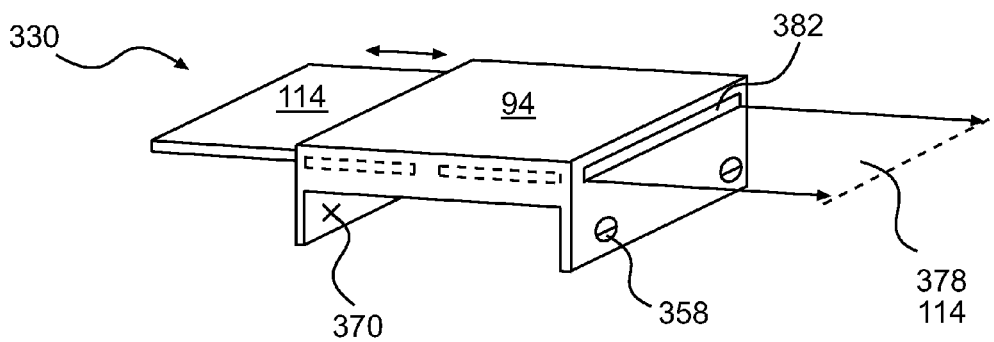
FIG. 21 is a perspective view of a utility module in accordance with an embodiment of the present invention.

Turning now to FIG. 21 where is illustrated a utility module 330 provided with two transversally extending working areas 378 extending from their respective openings 382 disposed on each side of the utility module 30.

Figure 22:
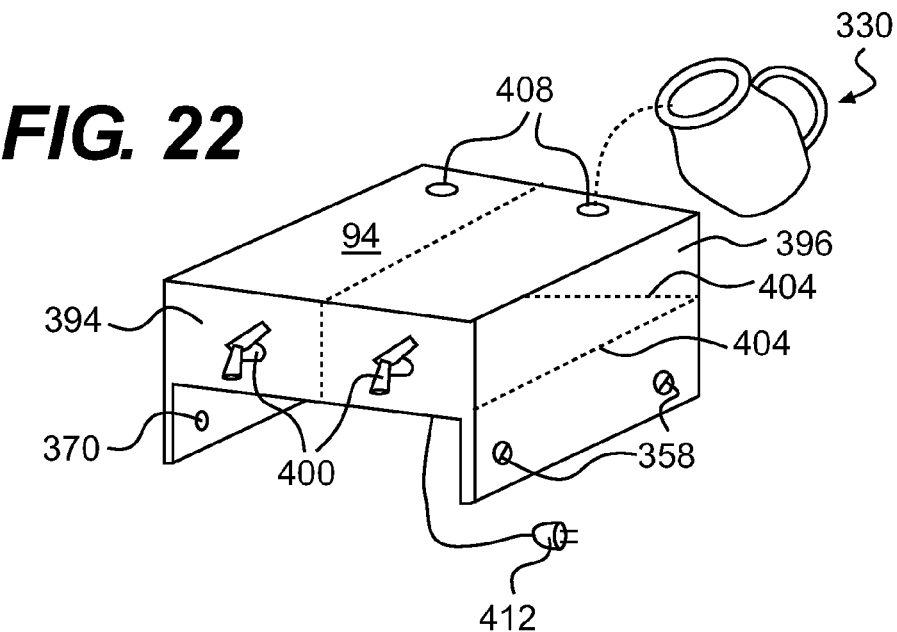
FIG. 22 is a perspective view of a utility module in accordance with an embodiment of the present invention.

FIG. 22 illustrates another utility module 330 adapted with two liquid receiving compartments 394, 396. Each liquid receiving compartment 394, 396 is respectively provided with a corresponding valve 400 adapted to serve the liquid contained in each respective liquid receiving compartment 394, 396. Each compartment 394, 396 can optionally be provided with an angular bottom 404 adapted to force the liquid contained in a compartment 394, 396 toward the valve 400. In the present situation, there is one valve 400 on each side of the liquid receiving compartment 394, 396 explaining why the bottom of the liquid receiving compartment 394, 396 is angled in both directions. A top opening 408 is provided on top of each liquid receiving compartment 394, 396 to insert liquid therein. Additionally, an electric connector 412 is provided with the utility module 330 to power an internal heating element (not illustrated) to keep the liquid warm if desired.

The electric connector 412 generally is a connector adapted to mate with a cooperating connector (not illustrated) disposed on counterpart equipment to transfer data, power or a combination of data and energy therebetween. Alternatively, the electric connector 412 can be a dock connector adapted to dock one module to a base dock and electrically connecting the module to the dock with connectors defined in the module and the base dock. The counterpart equipment can be a battery, a power pack, a network hub or other connectable means providing data or power to the utility module 330 connected therewith.

The electric connector 412 can be connected to the counterpart in the body 14 or elsewhere. The electric connector 412 of the present embodiment is not limited to connect to a power source counterpart and can alternatively be connected to a data source counterpart. Both data and power could be transmitted via the electric connector 412 if required. The counterpart can also be located in a galley adapted to receive therein one or many galley carts 10. Connectors adapted to meet the regulations are well known in the art and won't be discussed in further details therein.

Figure 23:
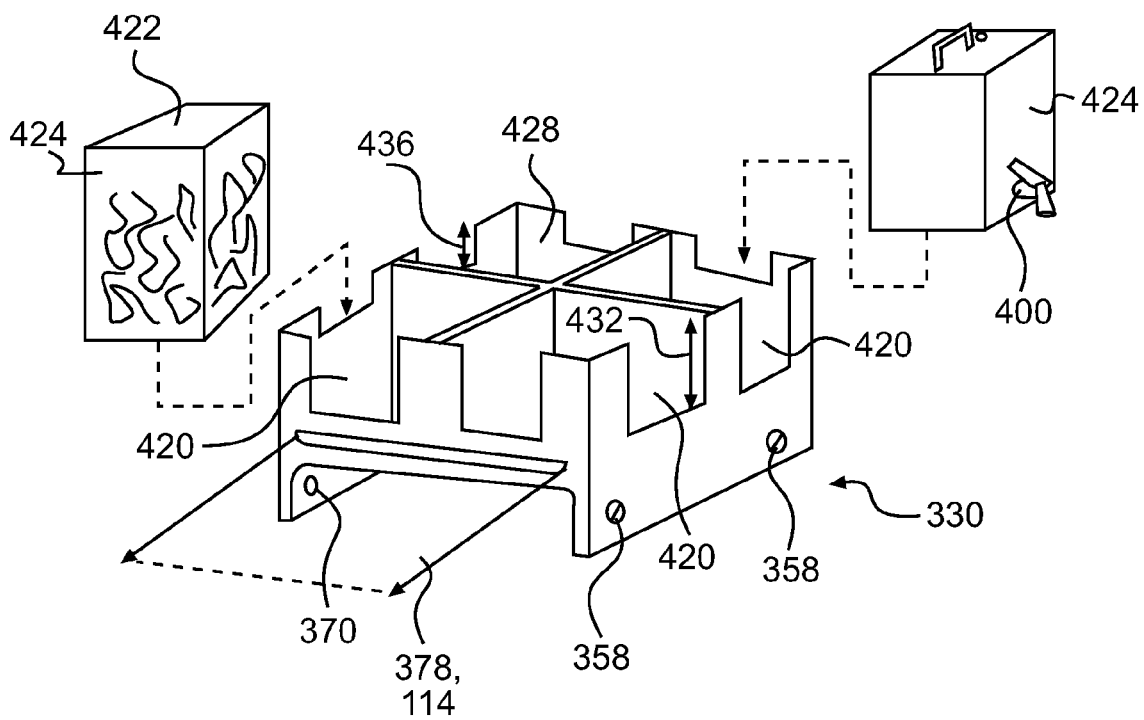
FIG. 23 is a perspective view of a utility module in accordance with an embodiment of the present invention.

Turning now to FIG. 23 that illustrates another alternate top module 330 provided with receptacles 428 adapted to receive modular containers 424 therein. A wall indentation 420 is provided on the sides of the receptacles 428 to allow modular containers 424 with dispensing valves 400 to be inserted therein. The size of the indentation 420 can vary 432, 436 according to the intended purpose of each receptacle 428. In the present illustrating example, a liquid modular container 424 and an ice modular container 422 are illustrated. These modular containers 422, 424 can be insulated if required. A skilled reader could infer other types and shapes of modular containers 422, 424 adapted to perform other functions without departing from the scope of the present invention.

Figure 24:
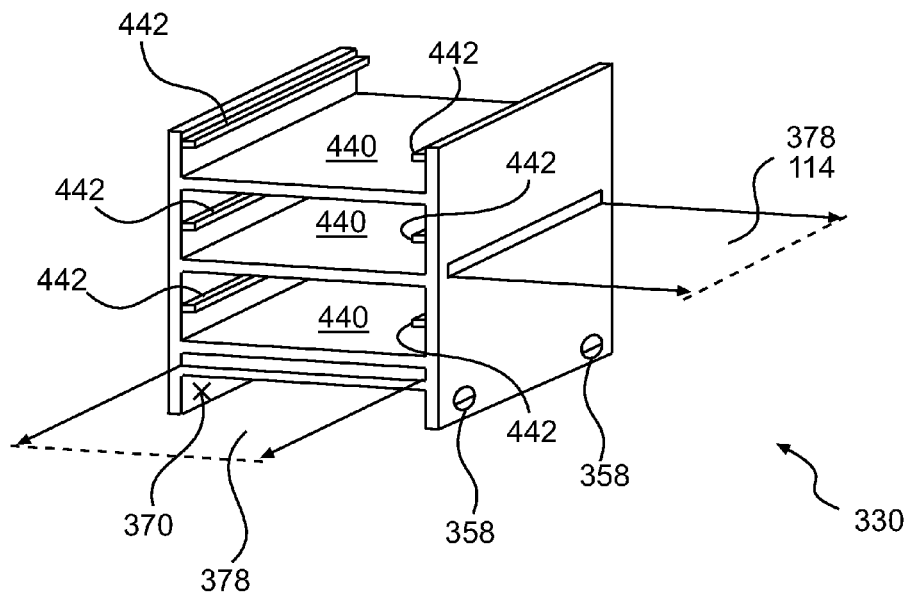
FIG. 24 is a perspective view of a utility module in accordance with an embodiment of the present invention.

FIG. 24 illustrates another utility module 330 adapted to receive trays (not shown) therein. Each opening 440 is provided with a pair of rails 442 adapted to slide a tray thereon. The size of the openings 400 can vary according to their intended purpose and the rails 402 can be omitted if not required. For instance, this exemplary utility module 330 allows easy access of trays without accessing the interior of the body 14 of the galley cart 10 every time a tray is needed.

Figure 25:
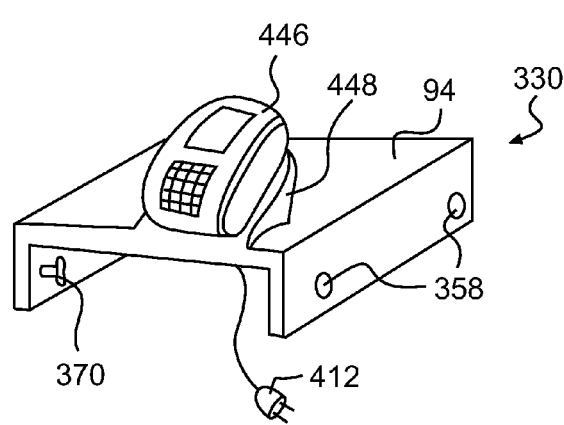
FIG. 25 is a perspective view of a utility module in accordance with an embodiment of the present invention.

FIG. 25 illustrates a utility module 330 equipped with a mobile payment device 446. The mobile payment device 446 can optionally be connected to a power source or a data source via the connector 412 provided with the utility module 330. The mobile payment device 446 can removable rest on a support 448 defined in the utility module 330. An extendable connector (not shown) can keep the mobile payment device 446 connected to the galley cart 10 when remotely used by a client/passenger. A planar working area 94 is also provided on the same utility module 330.

All the concepts of the above-described exemplary utility modules 330 can be embodied differently. Other arrangements of boxes, receptacles, modular containers and extending working areas can differ from the illustrative examples provided above without departing from the scope of the present invention.

Figure 26:
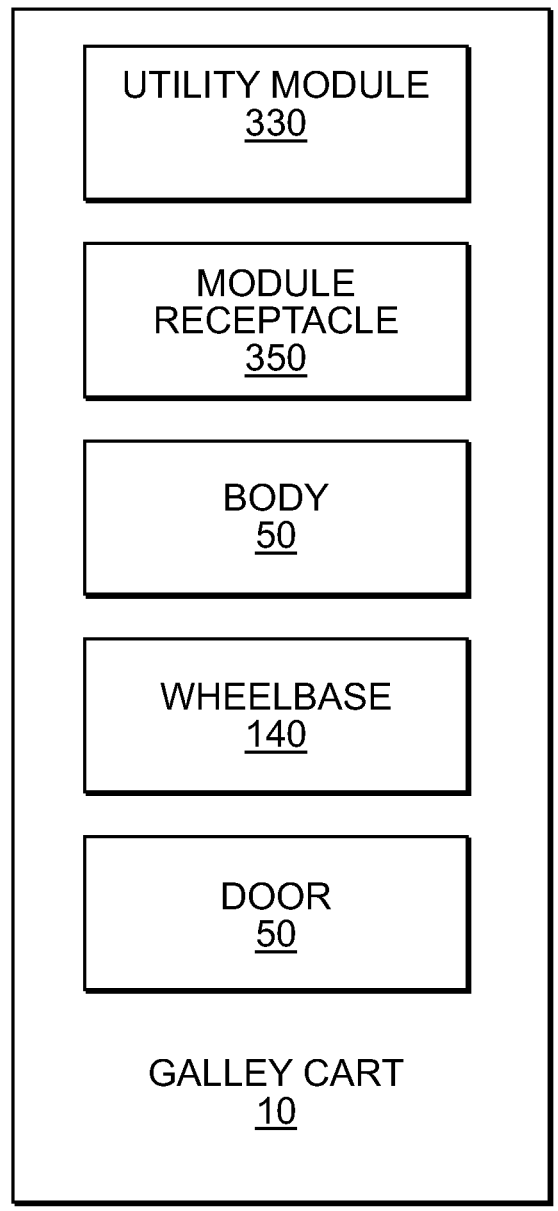
FIG. 26 is a block diagram of galley cart components in accordance with an embodiment of the present invention.

Referring now to FIG. 26, a person skilled in the art can appreciate a galley cart 10 schematically separated in various modules. In the presented embodiment, the galley cart 10 comprises a utility module 330, a module receptacle 350, a body 14, a wheelbase 140 (that includes a set of wheels 144 thereof) and a door 50 of an appropriate length.

Figure 27:
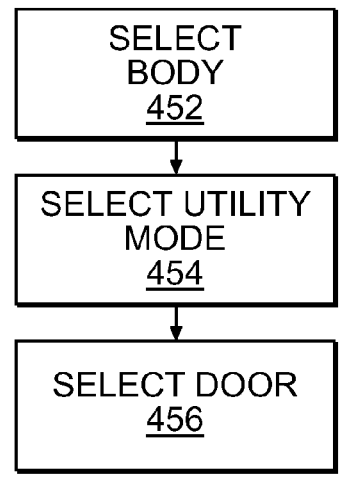
FIG. 27 is a flow chart of the selection of galley cart components in accordance with an embodiment of the present invention.
Figure 28:
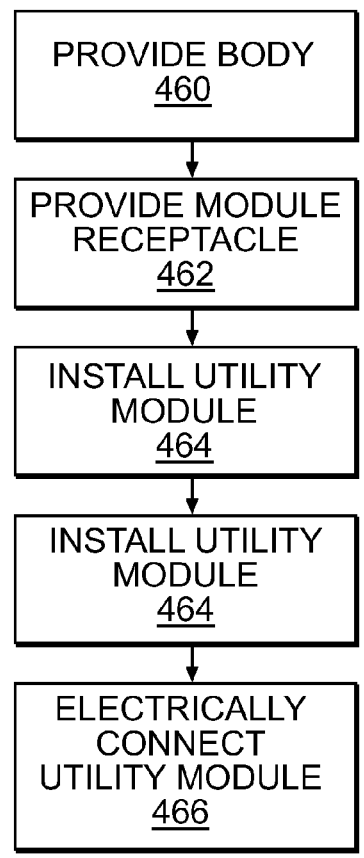
FIG. 28 is a flow chart of the selection and connection of galley cart components in accordance with an embodiment of the present invention.

Turning now to FIG. 27 depicting a flow chart representing exemplary steps for selecting the various components/modules required to assemble a modular galley cart 10. A body 14 is first selected 452, then the desired utility module 330 is selected 454 and a door 50 is selected in accordance with the location of the utility module 330 on the body 14 (e.g. inside the body or outside). The next FIG. 28 is directed to exemplary steps for providing 460 a body 14 (either a full size of a half size body 14, 180), providing 462 a module receptacle 462, installing 464 a utility module 330 directly on the body 14 or via the module receptacle 350 and electrically connecting 466 the utility module 330 to a counterpart if required.

Figure 29:
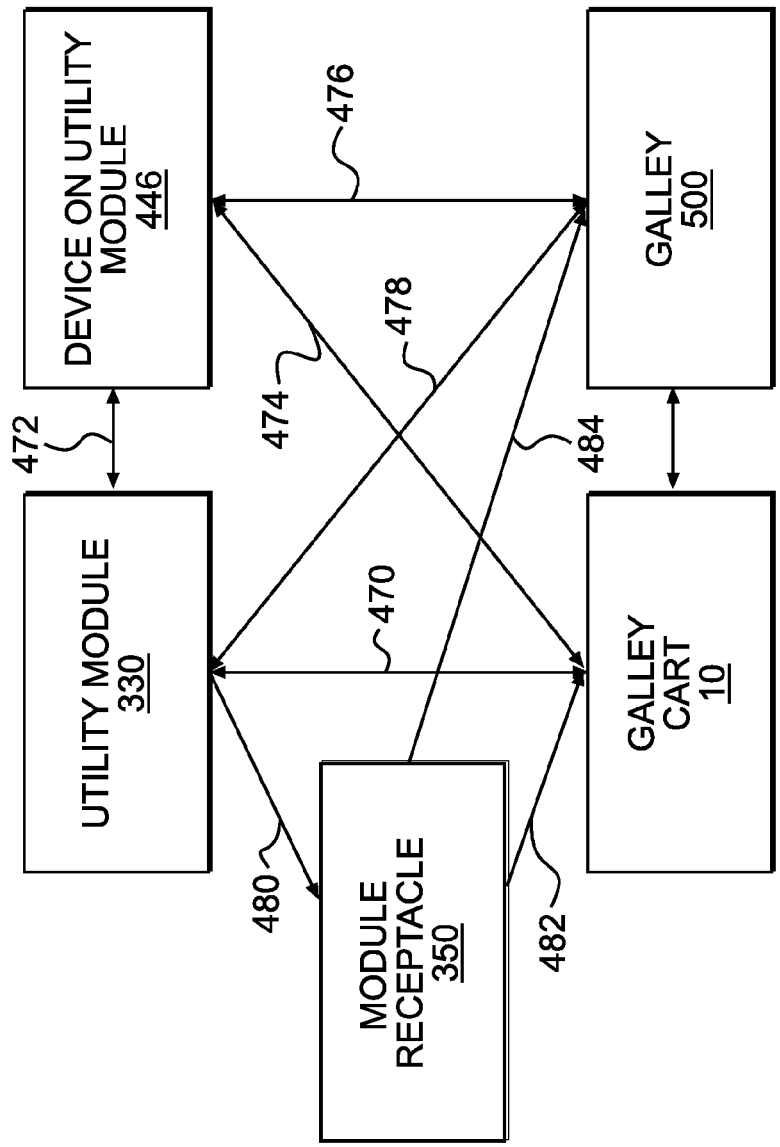
FIG. 29 is a block diagram of possible connection between various elements of a galley cart in accordance with an embodiment of the present invention.

To emphasis a little more on the connectivity of the utility module 330 with a cooperating counterpart, FIG. 29 illustrates possible connections among the elements. A utility module 330 is electrically or electronically connectable in several ways as illustrated. It can be directly connected 470 to the galley cart 10 or to the galley 500. The utility module 330 can alternatively be connected to the galley 500 via 480 a module receptacle 350 that is connected 482 to the galley cart 10 or the galley 484, 500. A device 446 associated with the utility module 330 can be directly connected 474 to the galley cart 10 or to the galley 476, 500.

The description and the drawings that are presented above are meant to be illustrative of the present invention. They are not meant to be limiting of the scope of the present invention. Modifications to the embodiments described may be made without departing from the present invention, the scope of which is defined by the following claims.

What is claimed is:

1. A modular utility cart comprising:
   a body including a pair of opposed lateral portions, each lateral portion including an upper side and a bottom side thereof, the pair of opposed lateral portions being interconnected at the bottom side thereof with a bottom portion forming a structural cavity thereof, the body including a door opening thereof framed on three edges by the pair of opposed lateral portions and the bottom portion;
   wheels attached to the bottom portion of the body for supporting the body; and
   a door pivotably attached to one of the opposed lateral portions of the body and adapted to mate with the door opening,
   wherein the pair of opposed lateral portions are interconnected, on an upper side thereof, via a utility module selected from a plurality of utility modules having respective functions thereof, the pair of opposed lateral portions interconnected with two lateral sides of the utility module forming the structural cavity thereof, the utility module forming the upper surface of the body while using substantially no volume inside the cart between the lateral portions, the utility module providing a door abutment portion adapted to frame a fourth edge of the door opening of the utility cart, the body comprising a module receptacle adapted to secure the utility module to the cart with an edge for positioning the utility module, wherein the module receptacle does not increase the width of the cart when the utility module is secured to the module receptacle.

2. The modular utility cart of claim 1, wherein the module receptacle further comprises a securing mechanism adapted to secure the utility module with the module receptacle.

3. The modular utility cart of claim 1, wherein the body is substantially made of composite materials including Phenolic resin.

4. The modular utility cart of claim 1, wherein the composite materials comprise multiple layers of reinforcement and resin, distanced by an intervening foam core to increase the stiffness of the body.

5. The modular utility cart of claim 1, wherein the body has a substantially tubular shape and the utility module is substantially forming a portion of the tubular shape.

6. The modular utility cart of claim 1, wherein the utility module is permanently secured to the lateral portions.

7. The modular galley cart of claim 1, wherein the utility module further comprises an electrical connector adapted to electrically connect an electrical counterpart to exchange at least one of data and power.

8. The modular utility cart of claim 1, wherein the utility module includes a mobile payment device.

9. The modular utility cart of claim 1, wherein the utility module includes an extendable shelf.

10. The modular galley cart of claim 1, wherein the utility module includes a cavity adapted to receive goods therein.

11. The modular utility cart of claim 1, wherein the utility module includes a reservoir adapted to contain fluid therein.

12. The modular utility cart of claim 1, wherein the utility module is insulated to prevent heat transfer from an internal portion of the utility module and the environment.

13. A modular utility cart kit comprising:
   a body including a pair of opposed lateral portions, each lateral portion including an upper side and a bottom side thereof, the pair of opposed lateral portions being interconnected at the bottom side thereof with a bottom portion forming a structural cavity thereof, the body including a door opening thereof framed on three edges by the pair of opposed lateral portions and the bottom portion;
   wheels adapted to be attached to one of the opposed lateral portions of the bottom portion of the body for supporting the body; and
   a door pivotably attached to the body and adapted to mate with the door opening, wherein the pair of opposed lateral portions are interconnected, on an upper side thereof, via a utility module selected from a plurality of utility modules having respective functions thereof, the pair of opposed lateral portions interconnected with two lateral sides of the utility module forming the structural cavity thereof, the utility module forming the upper surface of the body while using substantially no volume inside the cart between the lateral portions, the utility module providing a door abutment portion adapted to frame a fourth edge of the door opening of the utility cart, the body comprising a module receptacle adapted to secure the utility module to the cart with an edge for positioning the utility module, wherein the module receptacle does not increase the width of the cart when the utility module is secured to the module receptacle.

14. The modular utility cart kit of claim 13, wherein the body has a tubular shape and is made of composite material including a foam core and Phenolic resin.

* * * * *